(12) United States Patent
DeBaker

(10) Patent No.: US 11,407,090 B2
(45) Date of Patent: *Aug. 9, 2022

(54) TOOL BIT

(71) Applicant: MILWAUKEE ELECTRIC TOOL CORPORATION, Brookfield, WI (US)

(72) Inventor: Joseph M. DeBaker, Greenfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 280 days.

This patent is subject to a terminal disclaimer.

(21) Appl. No.: 16/044,675

(22) Filed: Jul. 25, 2018

(65) Prior Publication Data
US 2018/0326563 A1 Nov. 15, 2018

Related U.S. Application Data

(63) Continuation of application No. 15/828,567, filed on Dec. 1, 2017, now Pat. No. 10,065,294, which is a continuation of application No. 14/326,636, filed on Jul. 9, 2014, now Pat. No. 9,849,570, which is a continuation of application No. 13/759,171, filed on Feb. 5, 2013, now Pat. No. 8,800,407, which is a continuation of application No. 12/669,200, filed as
(Continued)

(51) Int. Cl.
*B25B 15/00* (2006.01)
*B23P 15/00* (2006.01)

(52) U.S. Cl.
CPC ............ *B25B 15/004* (2013.01); *B23P 15/00* (2013.01); *B25B 15/002* (2013.01); *B25B 15/005* (2013.01); *B25B 15/008* (2013.01); *Y10T 29/49982* (2015.01)

(58) Field of Classification Search
CPC ..... B25B 15/004; B25B 15/00; B25B 15/002; B25B 15/005; B25B 15/008; Y10T 29/49982
USPC .................................. 81/436–438, 460, 461
See application file for complete search history.

(56) References Cited

U.S. PATENT DOCUMENTS 442,710 A 12/1890 Marsh
896,443 A 10/1907 Lund
(Continued)

FOREIGN PATENT DOCUMENTS

AU 686597 2/1998
CA 2181483 1/1994
(Continued)

OTHER PUBLICATIONS

Vessel, "Problem Solvers are ready to go!" catalog, 5 pages, printed from web site www.vessel.jp/online/pro_b_bit.html on Sep. 11, 2008.
(Continued)

*Primary Examiner* — Hadi Shakeri
(74) *Attorney, Agent, or Firm* — Michael Best & Friedrich LLP

(57) ABSTRACT

A tool bit includes a hexagonal drive portion, a working end, and a shank interconnecting the drive portion and the working end. The shank includes an outer peripheral surface. The outer peripheral surface tapers an entire length of at least one of the shank and the working end in a direction away from the drive portion.

15 Claims, 24 Drawing Sheets

Related U.S. Application Data application No. PCT/US2009/063515 on Nov. 6, 2009, now Pat. No. 8,418,587.

(60) Provisional application No. 61/112,318, filed on Nov. 7, 2008.

(56) References Cited

U.S. PATENT DOCUMENTS

| | | | |
|---|---|---|---|
| 876,675 A | 1/1908 | Albrecht | |
| 925,115 A | 6/1909 | Loewenberg | |
| 1,645,672 A | 10/1927 | Van Saun | |
| 1,776,525 A | 9/1930 | Talbot | |
| 1,923,132 A | 8/1933 | Witkin | |
| 1,932,113 A | 10/1933 | Long | |
| 1,979,460 A | 11/1934 | Forsberg | |
| 1,984,839 A | 12/1934 | Murray | |
| 2,010,616 A | 8/1935 | Walsh | |
| 2,022,703 A | 12/1935 | Banner | |
| 2,216,382 A | 10/1940 | West et al. | |
| 2,281,631 A | 10/1940 | West et al. | |
| D128,609 S | 8/1941 | Bakeman | |
| 2,307,556 A | 1/1943 | Wileman | |
| 2,366,682 A | 1/1945 | West et al. | |
| 2,397,216 A * | 3/1946 | Stellin | F16B 23/003 411/404 |
| 2,400,684 A | 5/1946 | Clark | |
| 2,410,971 A | 11/1946 | Hartley | |
| 2,417,225 A | 3/1947 | West et al. | |
| 2,445,978 A | 7/1948 | Stellin | |
| D150,800 S | 8/1948 | Magnus, Jr. | |
| 2,515,839 A | 7/1950 | Robertson | |
| 2,522,996 A | 9/1950 | Cone | |
| 2,523,041 A | 9/1950 | McKenzie | |
| 2,537,029 A | 1/1951 | Cambern | |
| 2,592,978 A | 4/1952 | Trimboli | |
| 2,621,688 A | 12/1952 | Wales | |
| 2,804,894 A | 9/1957 | Rosenburg | |
| 2,820,382 A | 1/1958 | Smith | |
| 2,833,548 A | 5/1958 | Clark | |
| 2,914,984 A * | 12/1959 | Ansingh | F16B 23/0038 411/403 |
| 2,964,931 A | 12/1960 | Sorenson | |
| 2,969,660 A | 1/1961 | Dale et al. | |
| 3,129,571 A | 4/1964 | Reynolds | |
| 3,151,512 A | 10/1964 | Charczenko | |
| 3,213,719 A | 10/1965 | Kloack | |
| 3,237,741 A | 3/1966 | Potter et al. | |
| 3,253,626 A | 5/1966 | Stillwagon, Jr. et al. | |
| 3,331,267 A | 7/1967 | Tietge | |
| 3,387,669 A | 6/1968 | Wise, Jr. et al. | |
| 3,392,793 A | 7/1968 | Pauley | |
| 3,393,722 A | 7/1968 | Windham | |
| 3,419,135 A | 12/1968 | Millner | |
| 3,592,087 A | 7/1971 | Pauley | |
| 3,703,916 A | 11/1972 | Sundsten et al. | |
| 3,753,625 A | 8/1973 | Fabrizio et al. | |
| 3,888,144 A | 6/1975 | Parsons | |
| 3,891,017 A | 6/1975 | Iskra | |
| 3,916,736 A | 11/1975 | Clemens | |
| 3,969,810 A | 7/1976 | Pagano | |
| 3,985,170 A | 10/1976 | Iskra | |
| 4,037,515 A | 7/1977 | Kesselman | |
| 4,092,753 A | 6/1978 | Fuhrmann | |
| 4,096,896 A | 6/1978 | Engel | |
| 4,105,056 A | 8/1978 | Arnn | |
| 4,215,600 A | 8/1980 | Kesselman | |
| 4,246,811 A | 1/1981 | Bondhus et al. | |
| 4,399,723 A | 8/1983 | Marleau | |
| 4,409,867 A | 10/1983 | Lyden | |
| 4,573,839 A | 3/1986 | Finnegan | |
| 4,680,996 A | 7/1987 | Gold | |
| 4,692,073 A | 9/1987 | Martindell | |
| 4,705,124 A | 11/1987 | Abrahamson et al. | |
| 4,782,574 A | 11/1988 | Karcher et al. | |
| 4,800,786 A | 1/1989 | Arnold et al. | |
| 4,825,732 A | 5/1989 | Arnold | |
| 4,833,951 A | 5/1989 | Karcher et al. | |
| 4,836,059 A | 6/1989 | Arnold | |
| 4,838,361 A | 6/1989 | O'Toole | |
| 4,852,196 A | 8/1989 | Martin | |
| 4,884,478 A | 12/1989 | Lieser | |
| 4,936,170 A | 6/1990 | Zumeta | |
| 4,947,713 A | 8/1990 | Arnold | |
| 4,982,627 A | 1/1991 | Johnson | |
| 5,012,708 A | 5/1991 | Martindell | |
| 5,012,709 A | 5/1991 | Su | |
| 5,028,304 A | 7/1991 | Stanishevsky et al. | |
| 5,031,488 A | 7/1991 | Zumeta | |
| 5,070,750 A | 12/1991 | Jones et al. | |
| 5,079,978 A | 1/1992 | Kupfer | |
| 5,140,877 A | 8/1992 | Sloan | |
| 5,176,050 A | 1/1993 | Sauer et al. | |
| 5,180,042 A | 1/1993 | Ogiso | |
| 5,182,973 A | 2/1993 | Martindell | |
| 5,199,336 A | 4/1993 | Wuilmart | |
| 5,228,250 A | 7/1993 | Kesselman | |
| 5,295,423 A | 3/1994 | Mikic | |
| 5,295,831 A | 3/1994 | Patterson et al. | |
| 5,299,474 A | 4/1994 | Hohmann et al. | |
| 5,330,230 A | 7/1994 | Craig | |
| RE34,680 E | 8/1994 | Lieser | |
| D350,685 S | 9/1994 | Perkins et al. | |
| 5,353,667 A | 10/1994 | Wilner | |
| 5,370,021 A | 12/1994 | Shigematsu | |
| D359,335 S | 6/1995 | Cartwright | |
| 5,535,867 A | 7/1996 | Coccaro et al. | |
| 5,619,882 A | 4/1997 | Godtner | |
| 5,676,421 A | 10/1997 | Brodsky | |
| 5,704,261 A | 1/1998 | Strauch et al. | |
| 5,791,212 A | 8/1998 | Han | |
| 5,819,606 A | 10/1998 | Arnold | |
| 5,830,287 A | 11/1998 | Pinnow et al. | |
| 5,868,047 A | 2/1999 | Faust et al. | |
| D410,372 S | 6/1999 | Strauch | |
| 5,953,969 A | 9/1999 | Rosenhan | |
| 5,957,012 A | 9/1999 | McCune | |
| 5,984,596 A | 11/1999 | Fehrle et al. | |
| 6,019,022 A | 2/2000 | Dotson | |
| 6,032,556 A | 3/2000 | Hu | |
| 6,047,618 A | 4/2000 | Pieri | |
| 6,082,227 A | 7/2000 | Vogel | |
| 6,089,133 A | 7/2000 | Liao | |
| RE36,797 E | 8/2000 | Eggert et al. | |
| 6,098,499 A | 8/2000 | Pool | |
| D431,768 S | 10/2000 | Feik | |
| 6,138,539 A | 10/2000 | Carchidi et al. | |
| 6,193,242 B1 | 2/2001 | Robison | |
| D445,325 S | 7/2001 | Fruhm | |
| 6,257,098 B1 | 7/2001 | Cirone | |
| 6,302,001 B1 | 10/2001 | Karle | |
| 6,308,598 B1 | 10/2001 | O'Neil | |
| 6,332,384 B1 | 12/2001 | Cluthe | |
| 6,345,560 B1 | 2/2002 | Strauch et al. | |
| 6,352,011 B1 | 3/2002 | Fruhm | |
| D455,627 S | 4/2002 | Song | |
| D455,943 S | 4/2002 | Lin | |
| 6,393,950 B1 | 5/2002 | Crosser | |
| 6,435,065 B2 | 8/2002 | Kozak et al. | |
| D462,596 S | 9/2002 | Fruhm | |
| 6,490,950 B2 | 12/2002 | Ray et al. | |
| 6,520,055 B1 | 2/2003 | Reusch et al. | |
| 6,547,562 B2 | 4/2003 | Kumar | |
| 6,701,814 B2 | 3/2004 | Purkapile | |
| 6,733,896 B2 | 5/2004 | Dolan et al. | |
| 6,761,093 B2 | 7/2004 | Chang | |
| 6,792,831 B2 | 9/2004 | Crosser | |
| 6,883,405 B2 | 4/2005 | Strauch | |
| 7,010,998 B2 | 3/2006 | Ying-Hao | |
| 7,028,588 B2 | 4/2006 | Shih | |
| 7,107,882 B1 | 9/2006 | Chang | |
| 7,117,765 B1 | 10/2006 | Wallden | |
| 7,143,670 B2 | 12/2006 | Geary | |
| 7,159,493 B1 | 1/2007 | Huang | |

(56) References Cited

U.S. PATENT DOCUMENTS

| | | | |
|---|---|---|---|
| 7,168,348 B2 | 1/2007 | Holland-Letz | |
| 7,188,556 B1 | 3/2007 | Rinner | |
| 7,261,023 B2 | 8/2007 | Taguchi | |
| 7,331,263 B2 | 2/2008 | Erickson et al. | |
| 7,437,979 B1 | 10/2008 | Wang | |
| D600,525 S | 9/2009 | Meng | |
| 7,581,470 B1 | 9/2009 | Huang | |
| 7,814,815 B2 | 10/2010 | Chen | |
| D627,205 S * | 11/2010 | Hsu | D8/86 |
| D646,138 S * | 10/2011 | Hsu | D8/86 |
| D646,139 S | 10/2011 | Hsu | |
| D658,465 S * | 5/2012 | Hsu | D8/86 |
| D663,186 S * | 7/2012 | Hsu | D8/86 |
| D663,187 S * | 7/2012 | DeBaker | B25B 15/002 D8/86 |
| 8,418,587 B2 | 4/2013 | DeBaker | |
| 2001/0001892 A1 | 5/2001 | Hu | |
| 2002/0046629 A1 | 4/2002 | Borschert et al. | |
| 2004/0007095 A1* | 1/2004 | Meng | B23B 51/10 81/53.2 |
| 2004/0099106 A1 | 5/2004 | Strauch et al. | |
| 2005/0028651 A1 | 2/2005 | Crosser | |
| 2005/0076749 A1 | 4/2005 | Liu | |
| 2005/0087045 A1 | 4/2005 | Gryciuk et al. | |
| 2006/0027054 A1 | 2/2006 | Wang | |
| 2006/0130621 A1 | 6/2006 | Novak et al. | |
| 2006/0230887 A1 | 10/2006 | Taguchi | |
| 2006/0266163 A1 | 11/2006 | Crosser | |
| 2006/0286506 A1 | 12/2006 | Birnholtz | |
| 2007/0028728 A1 | 2/2007 | Griffiths | |
| 2007/0062382 A1 | 3/2007 | Hu | |
| 2007/0131065 A1 | 6/2007 | Shih | |
| 2007/0227314 A1 | 10/2007 | Erickson et al. | |
| 2008/0034928 A1 | 2/2008 | Sheu | |
| 2008/0047401 A1 | 2/2008 | Lu | |
| 2008/0087142 A1 | 4/2008 | Lin | |
| 2008/0216616 A1 | 9/2008 | Hsieh | |
| 2008/0295650 A1 | 12/2008 | Hsieh | |
| 2010/0192736 A1 | 8/2010 | Burch et al. | |
| 2010/0275741 A1 | 11/2010 | Lai | |
| 2010/0288086 A1 | 11/2010 | Huang | |
| 2011/0283842 A1 | 11/2011 | Lai | |
| 2013/0145903 A1 | 6/2013 | DeBaker | |

FOREIGN PATENT DOCUMENTS

| | | |
|---|---|---|
| CN | 1245454 | 2/2000 |
| CN | 201070753 | 6/2008 |
| DE | 2231949 | 2/1973 |
| DE | 3907567 | 9/1989 |
| DE | 4207964 | 9/1993 |
| DE | 4300446 | 6/1994 |
| DE | 19614961 | 2/1997 |
| DE | 19622846 | 12/1997 |
| DE | 19628901 | 1/1998 |
| DE | 10123407 | 1/2002 |
| DE | 10144990 | 2/2003 |
| DE | 20303790 | 7/2003 |
| DE | 102007016000 | 1/2008 |
| DE | 202007016650 | 3/2008 |
| EP | 0221279 | 5/1987 |
| EP | 0267891 | 5/1988 |
| EP | 0279899 | 8/1988 |
| EP | 0467232 | 1/1992 |
| EP | 0336136 B1 | 5/1992 |
| EP | 0610693 | 8/1994 |
| EP | 0675782 | 10/1995 |
| EP | 741663 | 11/1996 |
| GB | 963097 | 7/1964 |
| GB | 1476441 | 6/1977 |
| JP | 2000006037 | 1/2000 |
| JP | 2000024946 | 1/2000 |
| JP | 2000167775 | 6/2000 |
| JP | 2000167776 | 6/2000 |
| JP | 2000198081 | 7/2000 |
| JP | 2004142005 | 5/2004 |
| JP | 2004202665 | 7/2004 |
| JP | 2004237420 | 8/2004 |
| JP | 2005254406 | 9/2005 |
| JP | 2005254407 | 9/2005 |
| JP | 2006051563 | 2/2006 |
| JP | 2007111790 | 5/2007 |
| JP | 2008093799 | 4/2008 |
| WO | 8908536 | 9/1989 |
| WO | 9004498 | 5/1990 |
| WO | 9414576 | 7/1994 |
| WO | 9415755 | 7/1994 |
| WO | 9520470 | 8/1995 |
| WO | 9630167 | 10/1996 |
| WO | 9912145 | 3/1999 |
| WO | 2006094940 | 9/2006 |
| WO | 2006100283 | 9/2006 |

OTHER PUBLICATIONS

Robert Bosch Power Tool Corporation, catalog, 1982, 3 pages.
Black & Decker, Catalog 1(K), Sep. 26, 1960, 4 pages.
Black & Decker, catalog, 1947, 4 pages.
PCT/US2009/063515 International Search Report and Written Opinion dated Dec. 23, 2009 (10 pages).

* cited by examiner

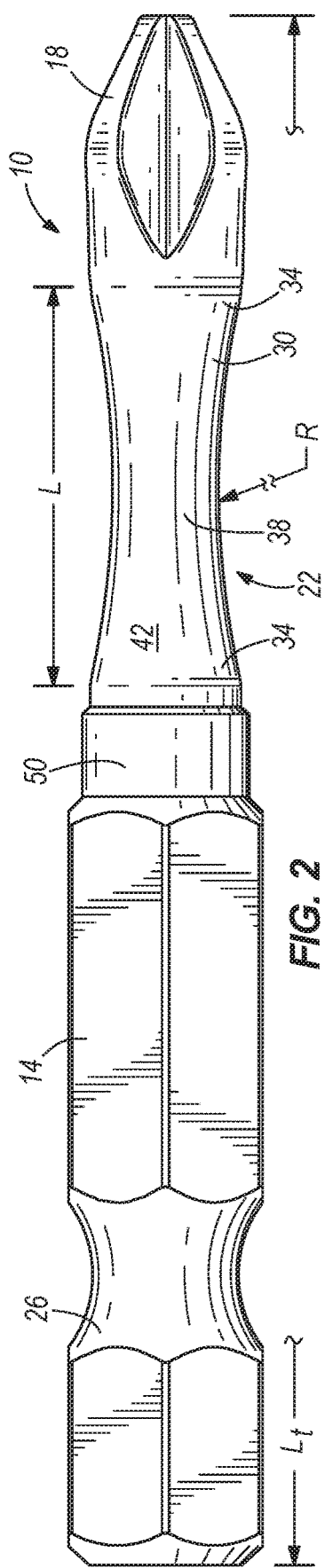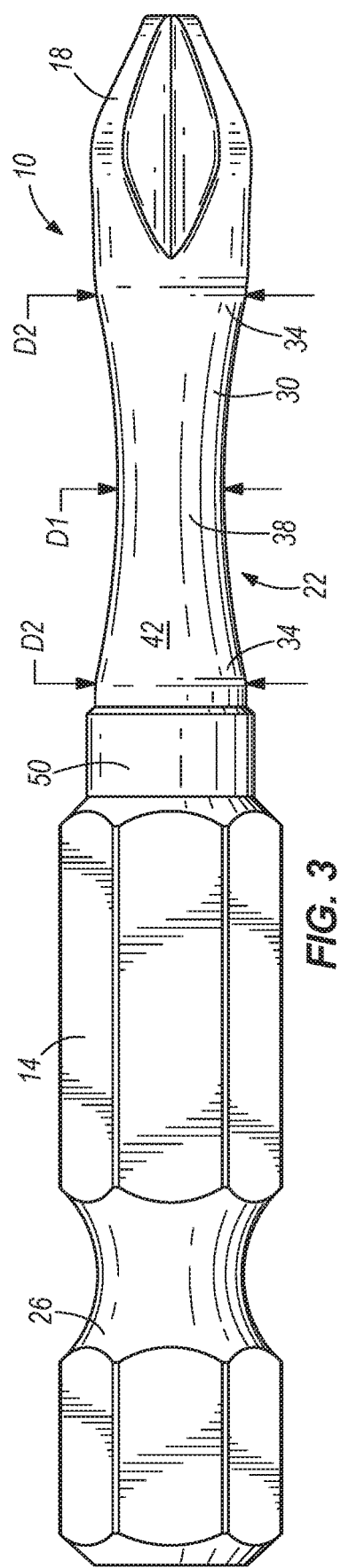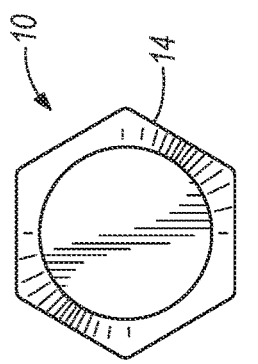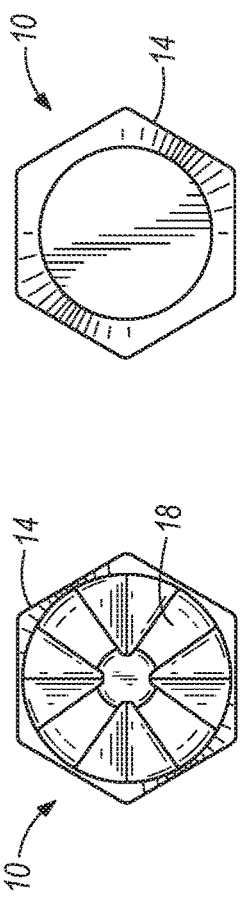

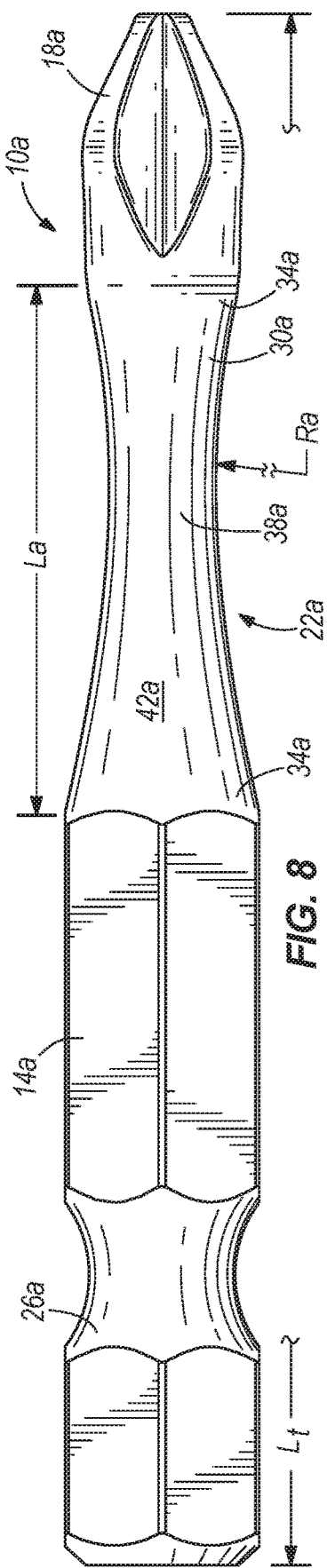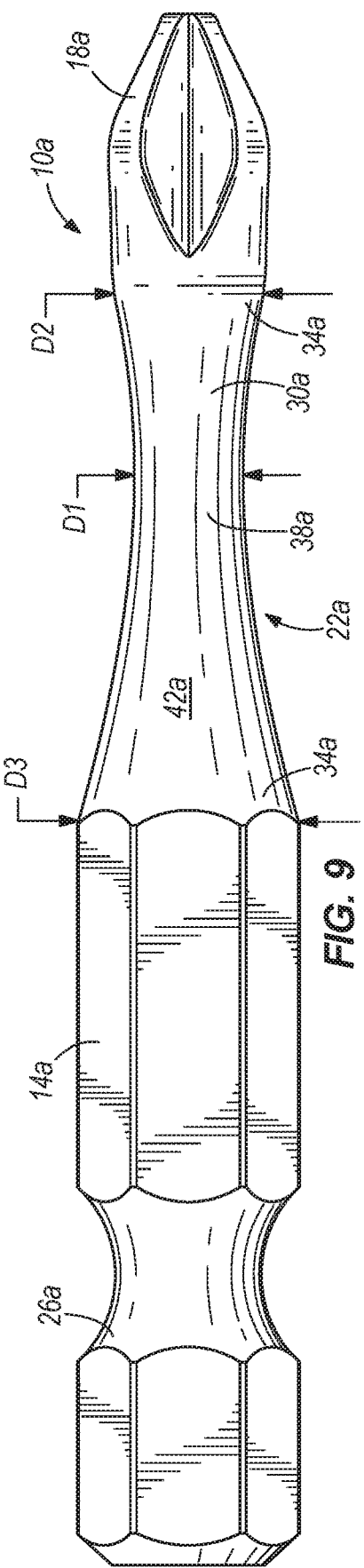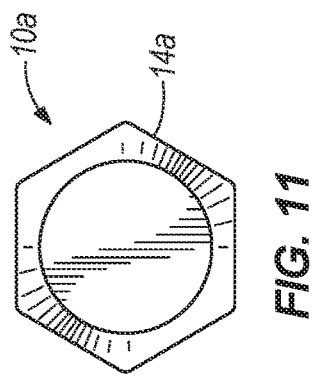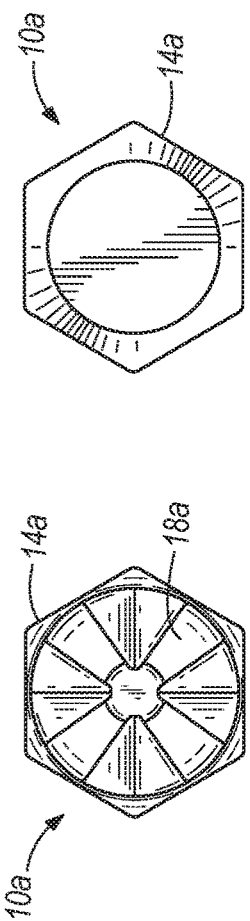

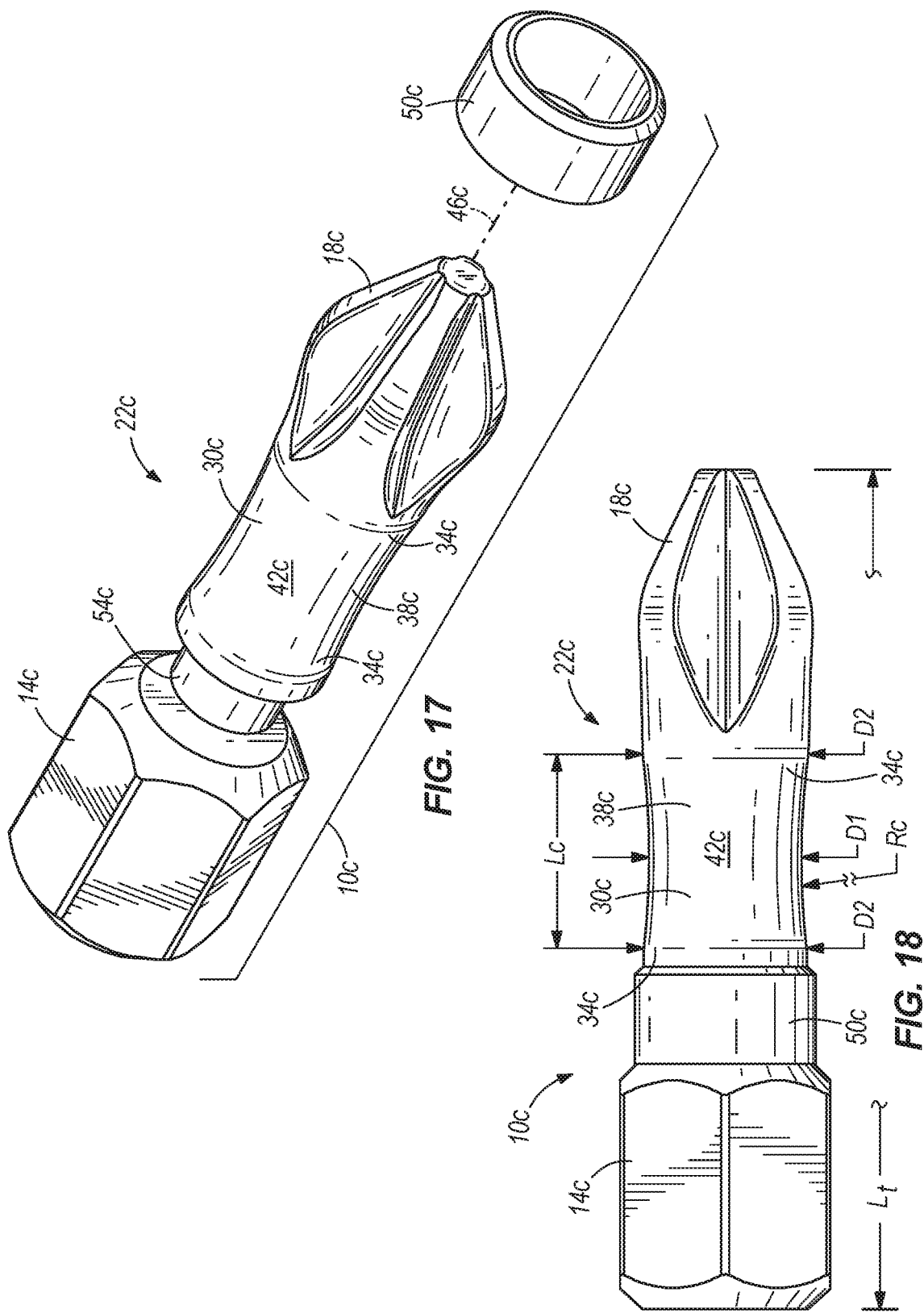

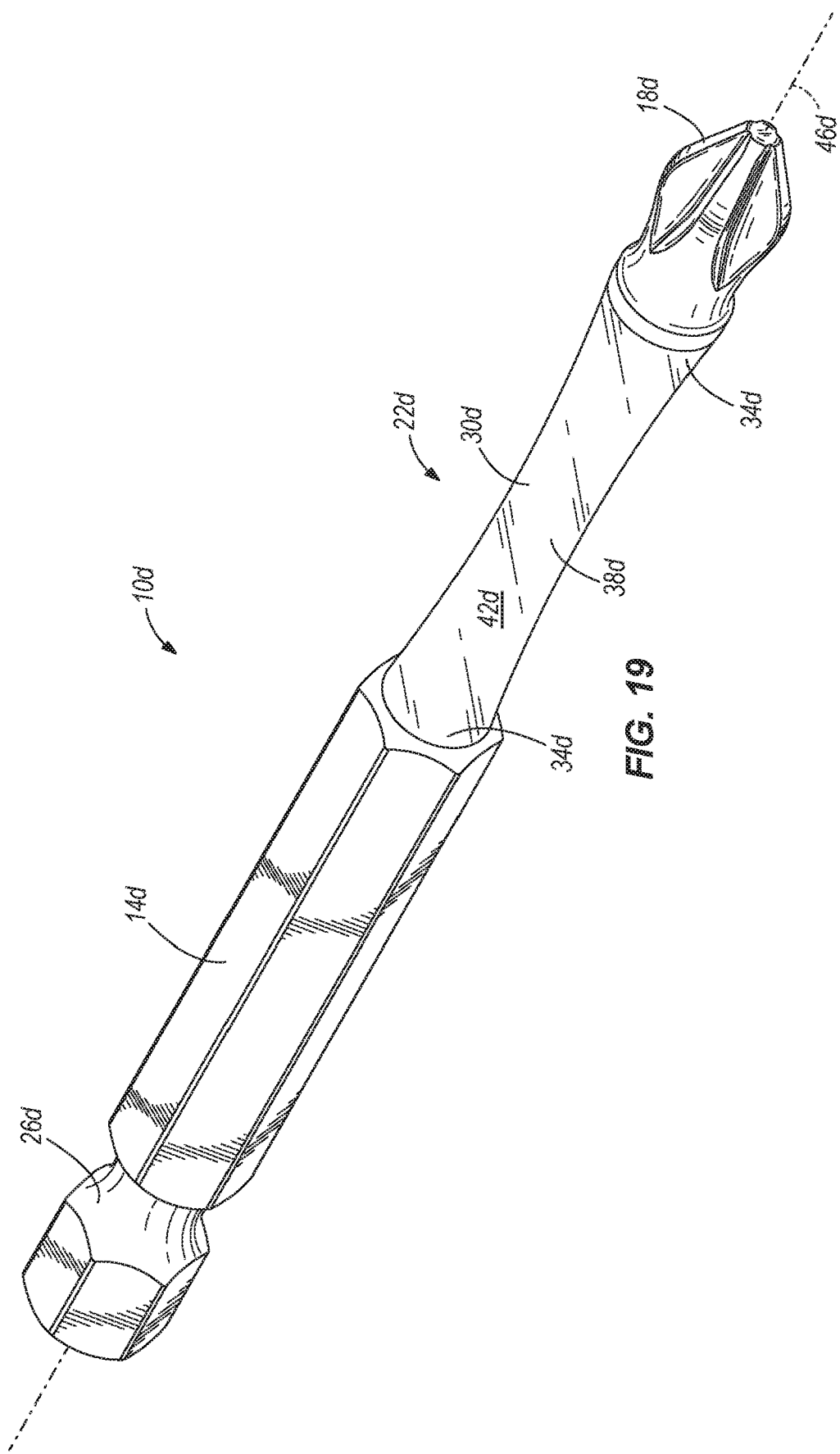

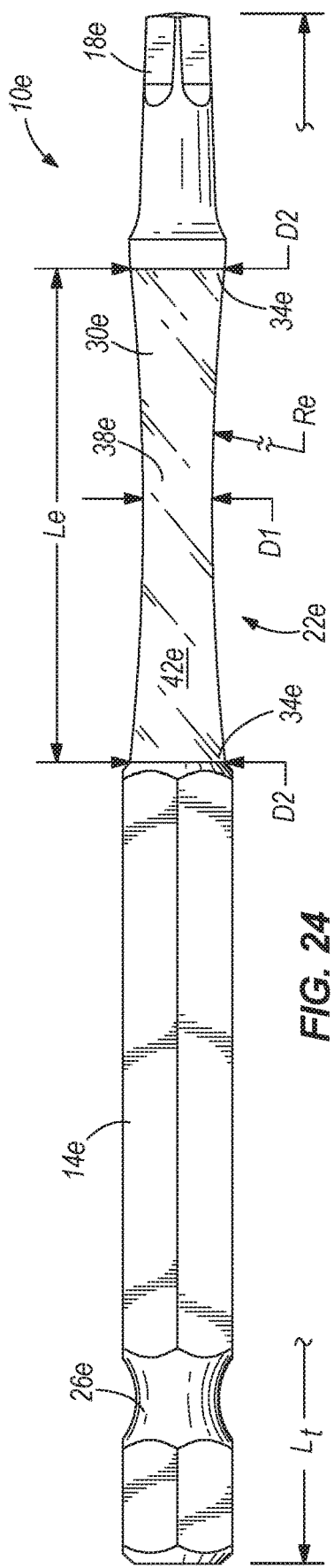
FIG. 24
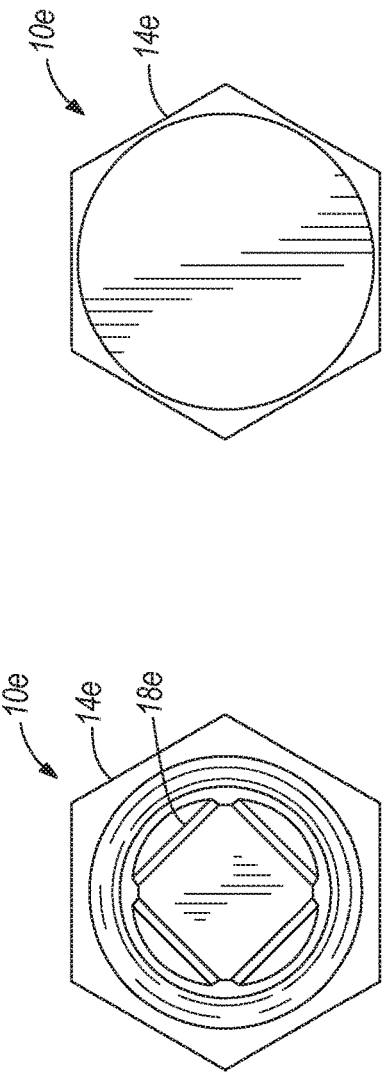
FIG. 26
FIG. 25

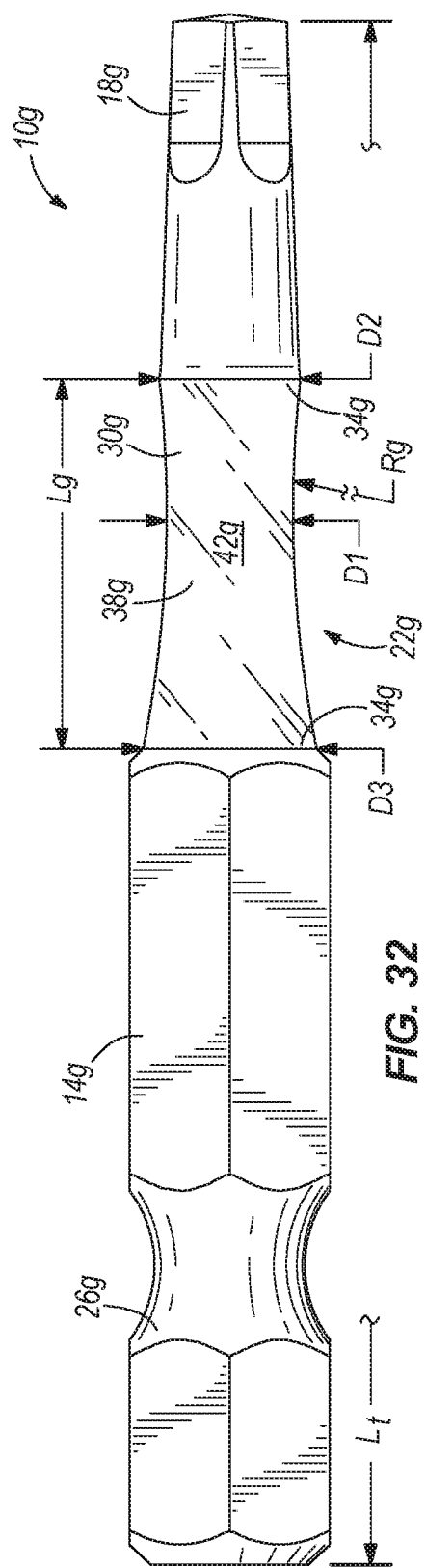
FIG. 32
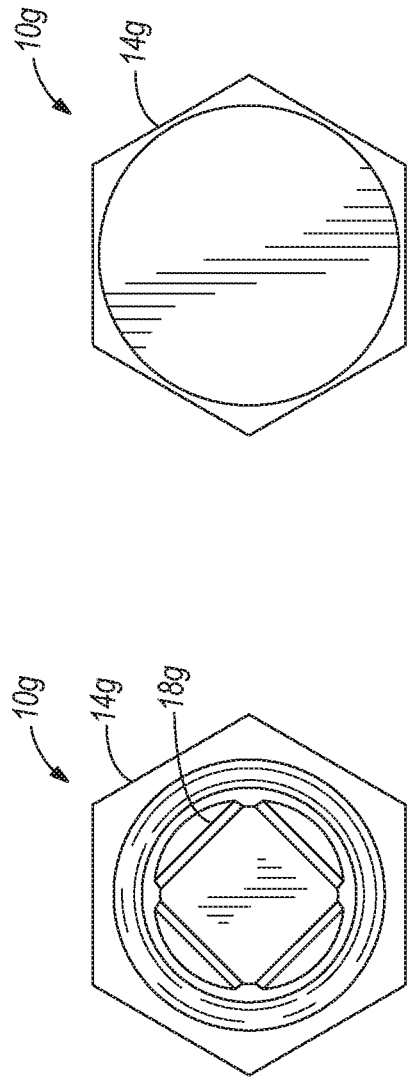
FIG. 34
FIG. 33

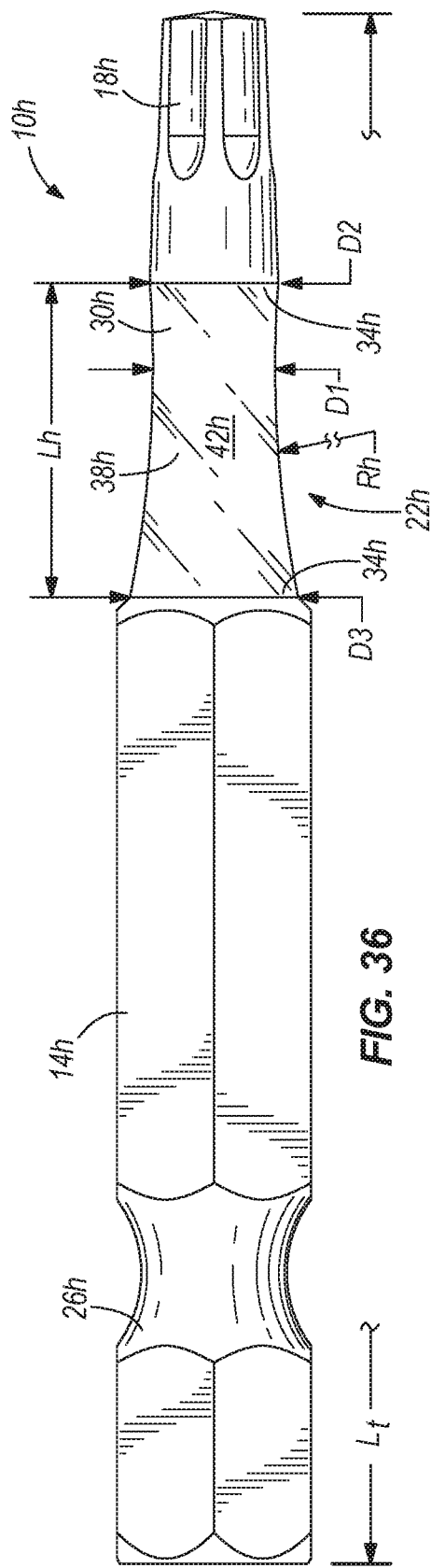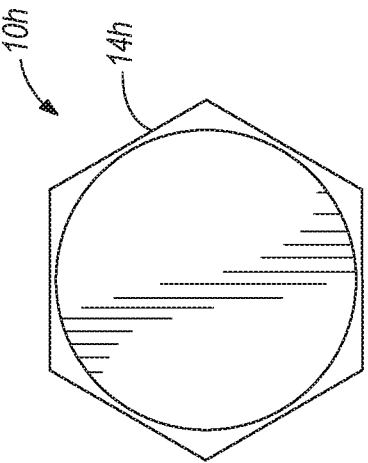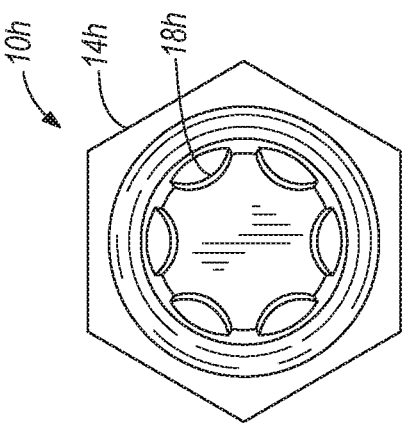

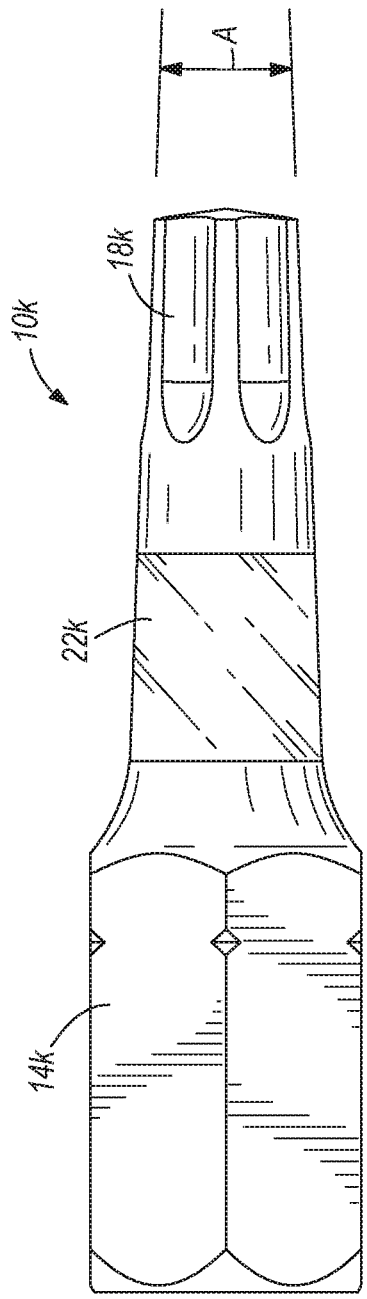
FIG. 48
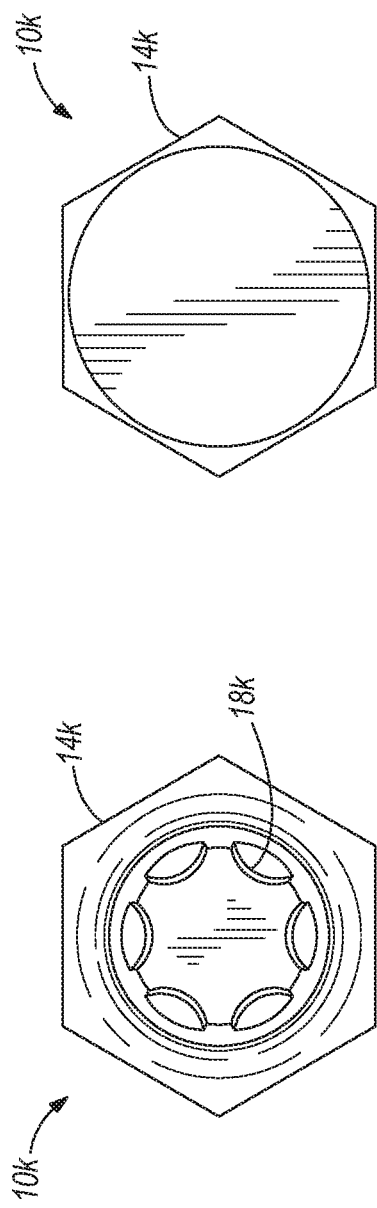
FIG. 49
FIG. 50

TOOL BIT

CROSS-REFERENCE TO RELATED APPLICATIONS

This application is a continuation of U.S. patent application Ser. No. 15/828,567 filed on Dec. 1, 2017, now U.S. Pat. No. 10,065,294, which is a continuation of U.S. patent application Ser. No. 14/326,636 filed on Jul. 9, 2014, now U.S. Pat. No. 9,849,570, which is a continuation of U.S. patent application Ser. No. 13/759,171 filed on Feb. 5, 2013, now U.S. Pat. No. 8,800,407, which is a continuation of U.S. patent application Ser. No. 12/669,200 filed on Jan. 15, 2010, now U.S. Pat. No. 8,418,587, which is a national phase application under 35 U.S.C. § 371 of International Patent Application No. PCT/US2009/063515 filed on Nov. 6, 2009, which claims priority to U.S. Provisional Patent Application No. 61/112,318 filed on Nov. 7, 2008, the contents of all of which are incorporated herein by reference.

FIELD OF THE INVENTION

The present invention relates to tool bits, and more particularly to tool bits configured for interchangeable use with a driver.

BACKGROUND OF THE INVENTION

Tool bits, or insert bits, are often used with drivers configured to interchangeably receive the bits. For example, typical insert bits each include a hexagonal drive portion, a head or tip configured to engage a fastener, and a cylindrical shank connecting the drive portion and the tip. Drivers include a socket having a hexagonal recess in which the hexagonal drive portion of an insert bit is received and a stem or shank extending from the socket, which can be coupled to a handle for hand-use by an operator, or a power tool (e.g., a drill) for powered use by the operator. An interference fit between the hexagonal drive portion of the insert bit and the socket may be used to axially secure the insert bit to the driver, or quick-release structure may be employed to axially secure the insert bit to the driver.

SUMMARY OF THE INVENTION

The invention provides, in one aspect, a tool bit including a hexagonal drive portion, a working end, and a shank interconnecting the drive portion and the working end. The shank includes an outer peripheral surface. The outer peripheral surface tapers an entire length of at least one of the shank and the working end in a direction away from the drive portion.

The invention provides, in another aspect, a tool bit including a hexagonal drive portion, a working end, and a shank interconnecting the drive portion and the working end. The shank includes an outer peripheral surface. The outer peripheral surface has a curvature in a plane containing a central axis of the tool bit. The shank does not increase in diameter along an entire length of the shank in a direction from the curvature toward the working end.

Other features and aspects of the invention will become apparent by consideration of the following detailed description and accompanying drawings.

BRIEF DESCRIPTION OF THE DRAWINGS

FIG. 2 is a side view of the tool bit of FIG. 1.
FIG. 3 is a top view of the tool bit of FIG. 1.
FIG. 4 is a front view of the tool bit of FIG. 1.
FIG. 5 is a rear view of the tool bit of FIG. 1.
FIG. 8 is a side view of the tool bit of FIG. 7.
FIG. 9 is a top view of the tool bit of FIG. 7.
FIG. 10 is a front view of the tool bit of FIG. 7.
FIG. 11 is a rear view of the tool bit of FIG. 7.
FIG. 17 is exploded perspective view of a tool bit according to yet another construction of the invention.
FIG. 18 is an assembled side view of the tool bit of FIG. 17.
FIG. 19 is a perspective view of a tool bit according to one construction of the invention.
FIG. 24 is a side view of the tool bit of FIG. 23.
FIG. 25 is a front view of the tool bit of FIG. 23.
FIG. 26 is a rear view of the tool bit of FIG. 23.
FIG. 32 is a side view of the tool bit of FIG. 31.
FIG. 33 is a front view of the tool bit of FIG. 31.
FIG. 34 is a rear view of the tool bit of FIG. 31.
FIG. 36 is a side view of the tool bit of FIG. 35.
FIG. 37 is a front view of the tool bit of FIG. 35.
FIG. 38 is a rear view of the tool bit of FIG. 35.
FIG. 48 is a side view of the tool bit of FIG. 47.
FIG. 49 is a front view of the tool bit of FIG. 47.
FIG. 50 is a rear view of the tool bit of FIG. 47.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
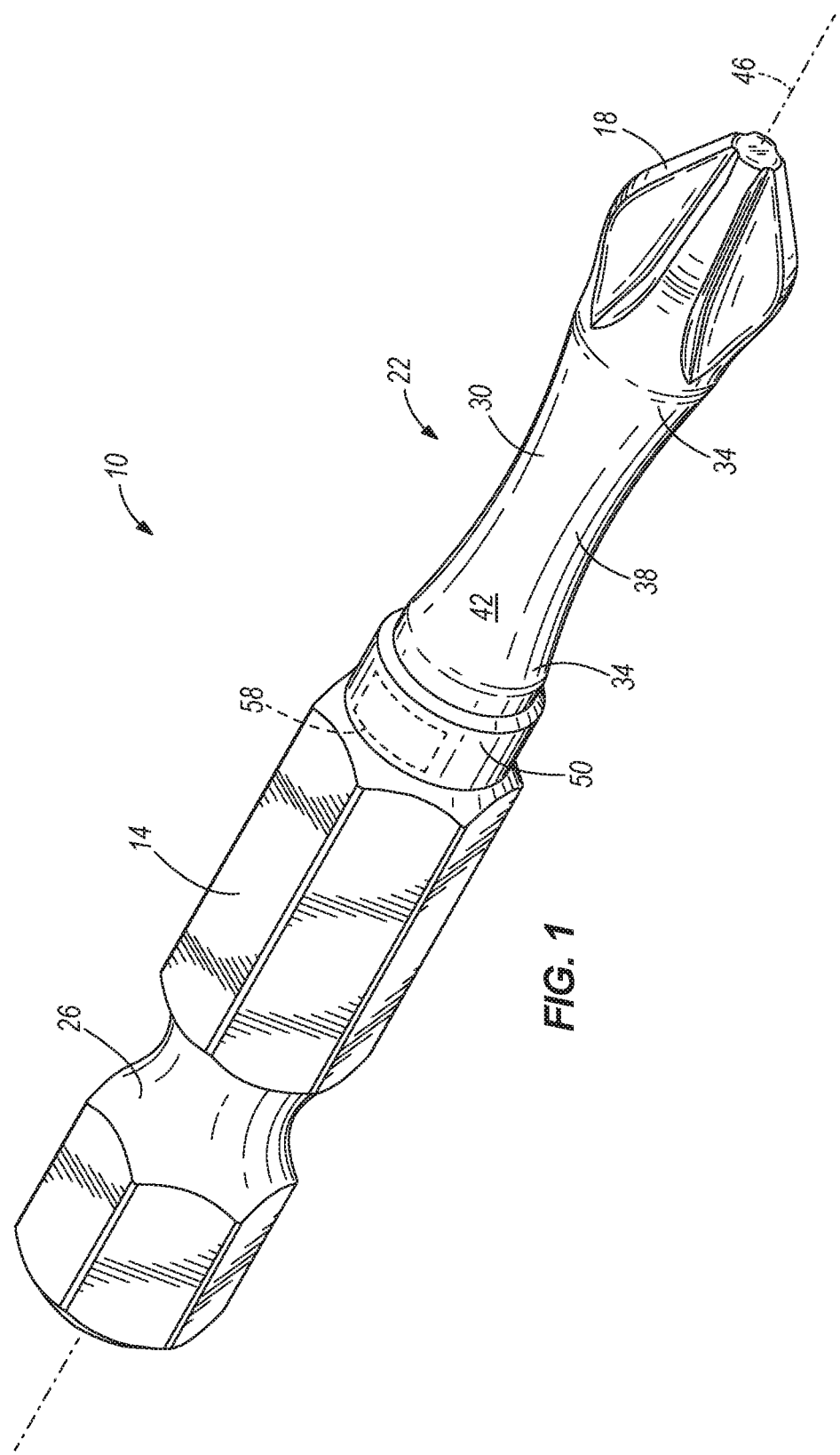
FIG. 1 is a perspective view of a tool bit according to one construction of the invention.

FIGS. 1-6 illustrate a tool bit or an insert bit 10 including a hexagonal drive portion 14, a head or tip 18 configured to engage a fastener, and a shank 22 interconnecting the drive portion 14 and the tip 18. The hexagonal drive portion 14 is intended to be engaged by any of a number of different tools, adapters, or components to receive torque from the tool, adapter, or component to rotate the insert bit 10. For example, the insert bit 10 may be utilized with a driver including a socket (not shown) having a corresponding hexagonal recess in which the hexagonal drive portion 14 of the insert bit 10 is received. The driver may also include a stem extending from the socket, which may be coupled to a handle for hand-use by an operator or to a chuck of a power tool (e.g., a drill) for powered use by the operator. An interference fit between the hexagonal drive portion 14 of the insert bit 10 and the socket may be used to axially secure the insert bit 10 to the driver. Alternatively, a quick-release structure may be employed to axially secure the insert bit 10 to the driver. With reference to FIGS. 1-3, the drive portion 14 of the insert bit 10 includes a groove 26 into which the quick-release structure (e.g., a ball detent) may be positioned to axially secure the insert bit 10 to the driver. Alternatively, the groove 26 may be omitted from the drive portion 14 of the insert bit 10 should an interference fit between the socket and the drive portion 14 be employed.

With continued reference to FIGS. 1-3, the tip 18 of the insert bit 10 is configured as a Philips-style tip 18 (see also FIG. 4). Alternatively, the tip 18 of the insert bit 10 may be differently configured to engage different style fasteners. For example, the tip 18 of the insert bit 10 may be configured as a straight blade (otherwise known as a "regular head") to engage fasteners having a corresponding straight slot. Other tip configurations (e.g., hexagonal, star, square, etc.) may also be employed with the insert bit 10.

With reference to FIGS. 1-3, a portion 30 of the shank 22 is concave, including opposite end portions 34 and a reduced diameter mid-portion 38. Specifically, the concave portion 30 of the shank 22 includes an outer peripheral surface 42 having a curvature in a plane including a central axis 46 of the insert bit 10 (i.e., in a plane parallel to the plane of the page of FIGS. 2 and 3). In a configuration of the insert bit 10 having an overall length Lt of about 1 inch, the curvature is defined by a radius R of about 0.15 inches to about 0.75 inches. Alternatively, in a configuration of the insert bit 10 having an overall length Lt of about 2 inches, the curvature is defined by a radius R of about 0.85 inches to about 2.75 inches. Further, in a configuration of the insert bit 10 having an overall length Lt of about 3 inches, the curvature is defined by a radius R of about 7 inches to about 15 inches.

With continued reference to FIGS. 1-3, in a configuration of the insert bit 10 having an overall length Lt of about 1 inch, the length L of the concave portion 30 of the shank 22 is about 0.2 inches to about 0.35 inches (i.e., the ratio of L/Lt is about 0.2:1 to about 0.35:1). Alternatively, in a configuration of the insert bit 10 having an overall length Lt of about 2 inches, the length L of the concave portion 30 of the shank 22 is about 0.5 inches to about 0.7 inches (i.e., the ratio of L/Lt is about 0.25:1 to about 0.35:1). Further, in a configuration of the insert bit 10 having an overall length Lt of about 3 inches, the length L of the concave portion 30 of the shank 22 is about 1.5 inches to about 1.8 inches (i.e., the ratio of L/Lt is about 0.5:1 to about 0.6:1).

With continued reference to FIGS. 1-3, in a configuration of the insert bit 10 having an overall length Lt of about 1 inch, a ratio of the radius R to the length L is equal to about 0.43:1 to about 3.75:1. Alternatively, in a configuration of the insert bit 10 having an overall length Lt of about 2 inches, a ratio of the radius R to the length L is equal to about 1.21:1 to about 5.5:1. Further, in a configuration of the insert bit 10 having an overall length Lt of about 3 inches, a ratio of the radius R to the length L is equal to about 4.12:1 to about 10:1. In the illustrated construction of the insert bit 10, which is configured having an overall length Lt of about 2 inches, the length L of the concave portion 30 of the shank 22 is about 0.514 inches, and the radius R of the concave portion 30 of the shank 22 is about 1.149 inches. As such, the ratio of the radius R to the length L is about 2.24:1. Also, in the illustrated construction of the insert bit 10, the diameter D1 of the mid-portion 38 is about 71% of the diameter D2 of each of the end portions 34. Alternatively, the diameter D1 of the mid-portion 38 may be about 60% to about 80% of the diameter D2 of each of the end portions 34. Further, the diameter D1 of the mid-portion 38 may be as large as about 0.236 inches. Alternatively, the diameter D1 of the mid-portion 38 may be as small as about 0.1 inches.

Figure 6:
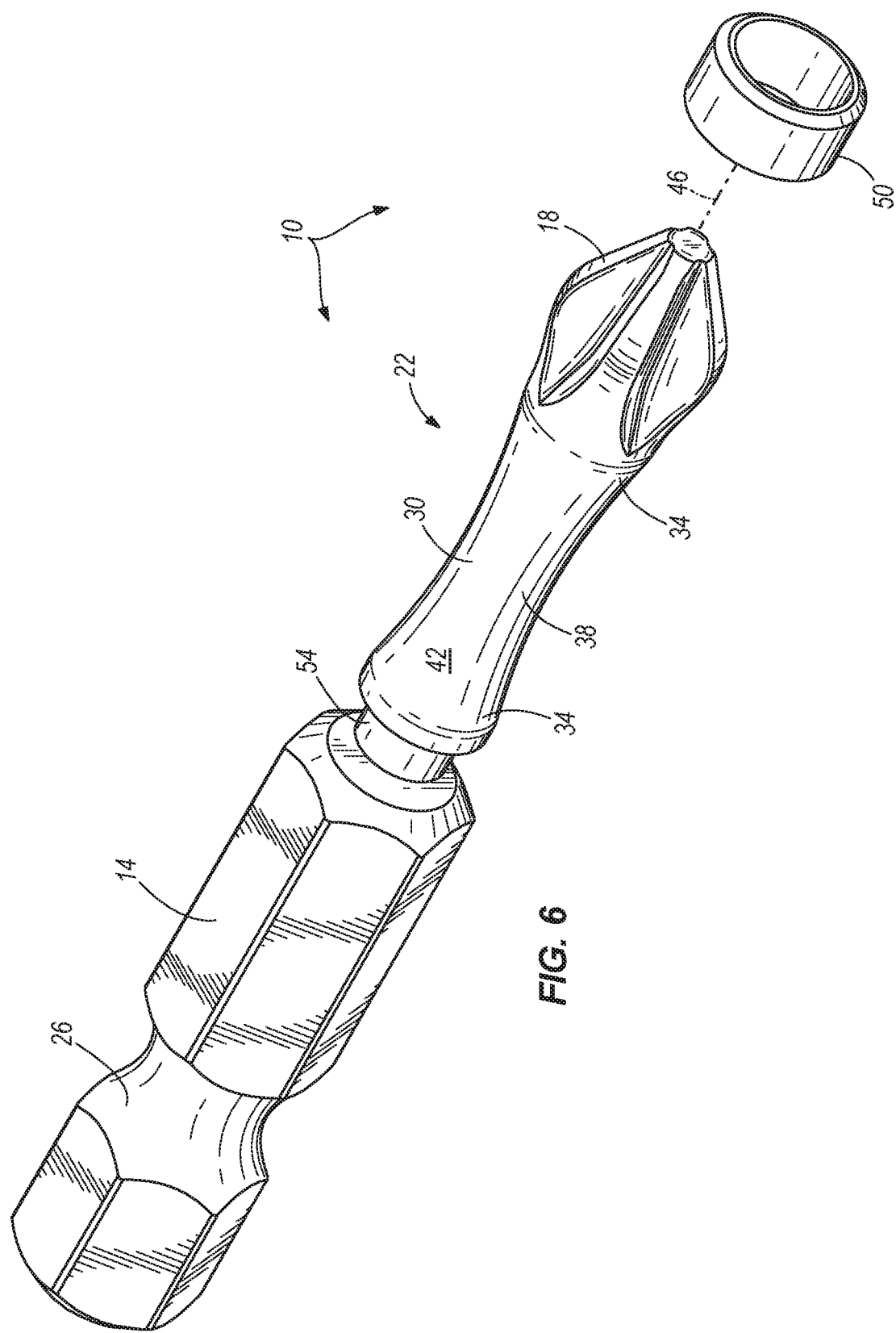
FIG. 6 is exploded perspective view of the tool bit of FIG. 1.

With reference to FIGS. 1-3 and 6, the insert bit 10 also includes an identification band 50 coupled to the shank 22. As shown in FIG. 6, the band 50 is shaped as a ring and is made from elastomeric material having a Scale A durometer of about 70 to about 90. Further, the inside diameter of the band 50 is less than the width of the Philips-style tip 18, such that the band 50 must be stretched when inserted over the tip 18 and onto the shank 22. Alternatively, the band 50 may be made from a thin, heat-shrinkable material that is inserted over the tip 18 and shrunk with application of heat onto the shank 22. Further, the band 50 may be configured with a non-cylindrical outer surface (e.g., a hexagonal outer surface).

With continued reference to FIG. 6, the shank 22 includes a circumferential groove 54 positioned between the concave portion 30 of the shank 22 and the drive portion 14 into which the band 50 is at least partially received. An inside diameter of the band 50 is less than or approximately equal to a width or thickness of the shank 22 in the groove 54 to yield an interference fit between the band 50 and the shank 22. In other words, the band 50 is at least partially stretched from its naturally occurring or unstretched shape after it is assembled onto the shank 22. In addition to the interference fit between the band 50 and the shank 22, an adhesive may be utilized to more permanently secure the band 50 to the shank 22. Alternatively, the circumferential groove 54 in the shank 22 may be omitted, and the band 50 may be positioned over a cylindrical portion of the shank 22 having an outer diameter greater than that of the concave portion 30 of the shank 22. Further, the band 50 may be coupled to the insert bit 10 in a different location along the length of the insert bit 10.

The identification band 50 may include any of a number of different indicators 58 (FIG. 1) associated with a particular characteristic of the insert bit 10. For example, the indicator 58 may be configured as a logo or design printed upon, impregnated into, or molded into the identification band 50 to indicate a manufacturer or brand of the insert bit 10. In addition, numbers, letters, or any combination thereof may be printed upon, impregnated into, or molded into the identification band 50 to indicate the particular size of the insert bit 10. Further, the color of the identification band 50 may serve as an indicator of a particular characteristic of the insert bit 10 (e.g., a manufacturer or brand identifier, sizing of the insert bit 10, etc.).

The insert bit 10 is manufactured from bar stock having a hexagonal cross-section. The tip 18 of the insert bit 10 is forged, and the concave portion 30 of the shank 22 is machined to a particular length L and a particular radius R (FIG. 2) to facilitate elastic deformation of the concave portion 30 of the shank 22 when the insert bit 10 is utilized with an impact driver. In addition, a machining process may be employed to create the circumferential groove 54 in the shank 22 in which the identification band 50 is positioned. Alternatively, any of a number of different manufacturing processes may be employed to create the insert bit 10. The insert bit 10 is also heat treated using a tempering process to a hardness range between 52-60 HRC. Alternatively, the insert bit 10 may be heat treated to a hardness range between 54-59 HRC. The same heat treating process is applied to the entire length of the insert bit 10, such that the resultant hardness of the insert bit 10 is substantially uniform or non-varying, within a tolerance value, along the entire length of the insert bit 10. In other words, the hardness of the concave portion 30 of the shank 22 is similar to that of the tip 18 and the drive portion 14 of the insert bit 10. Alternatively, a heat treating process may be employed to impart a varying hardness along the length of the insert bit 10. Particularly, the shank 22 may be heat treated such that the hardness of the shank 22 varies along the length L of the concave portion 30.

In operation of the insert bit 10, the concave portion 30 of the shank 22 is configured to increase the impact resistance or the toughness of the insert bit 10, such that the tip 18 of the insert bit 10 is allowed to elastically deform or twist relative to the drive portion 14 about the central axis 46 of the insert bit 10. Specifically, the polar moment of inertia of the shank 22 is decreased by incorporating the concave portion 30, thereby reducing the amount of torsion required to elastically twist the shank 22, compared to a configuration of the shank 22 having a cylindrical shape (i.e., without the reduced diameter mid-portion 38).

Figure 7:
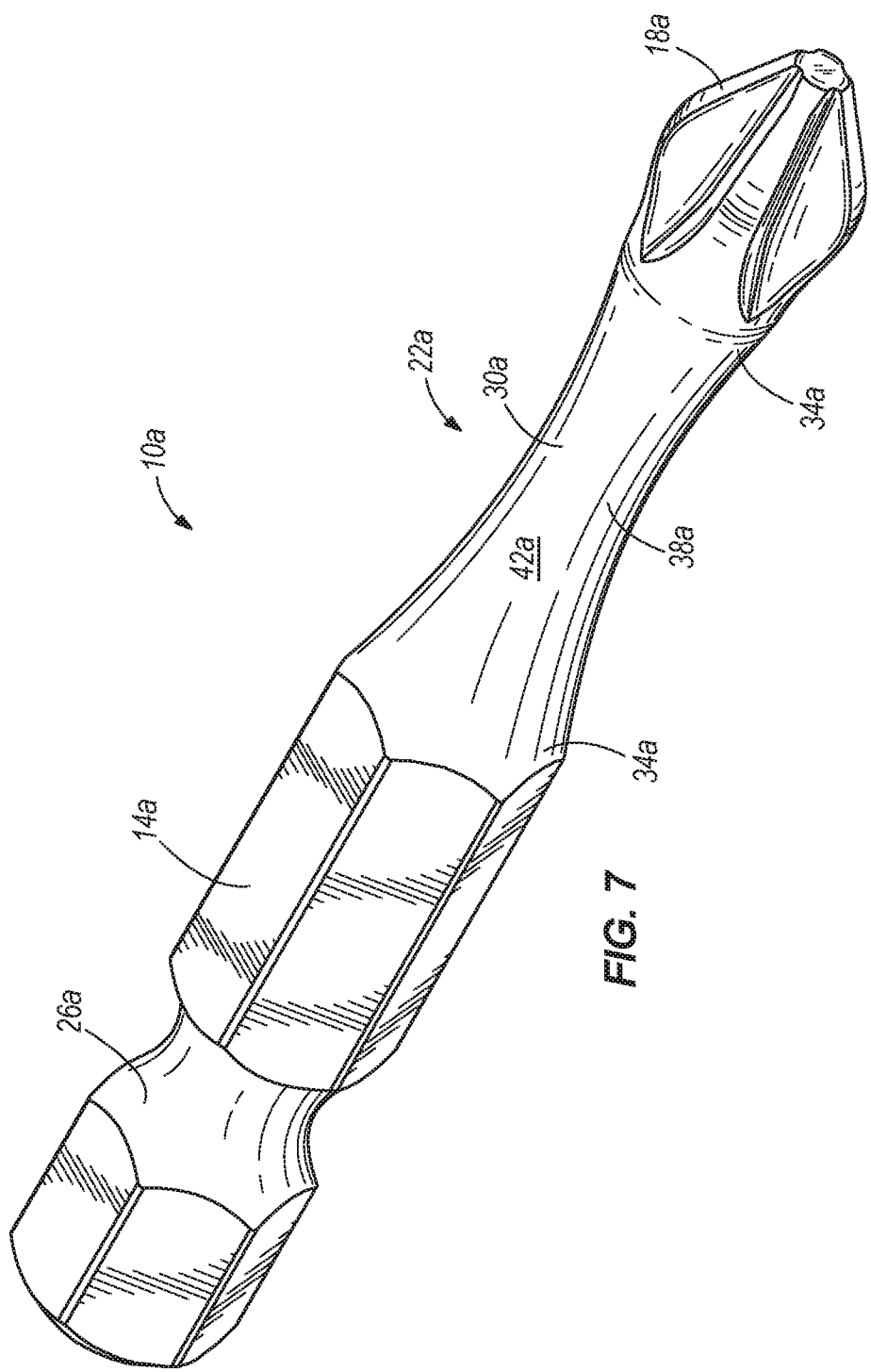
FIG. 7 is a perspective view of a tool bit according to another construction of the invention.
Figure 12:
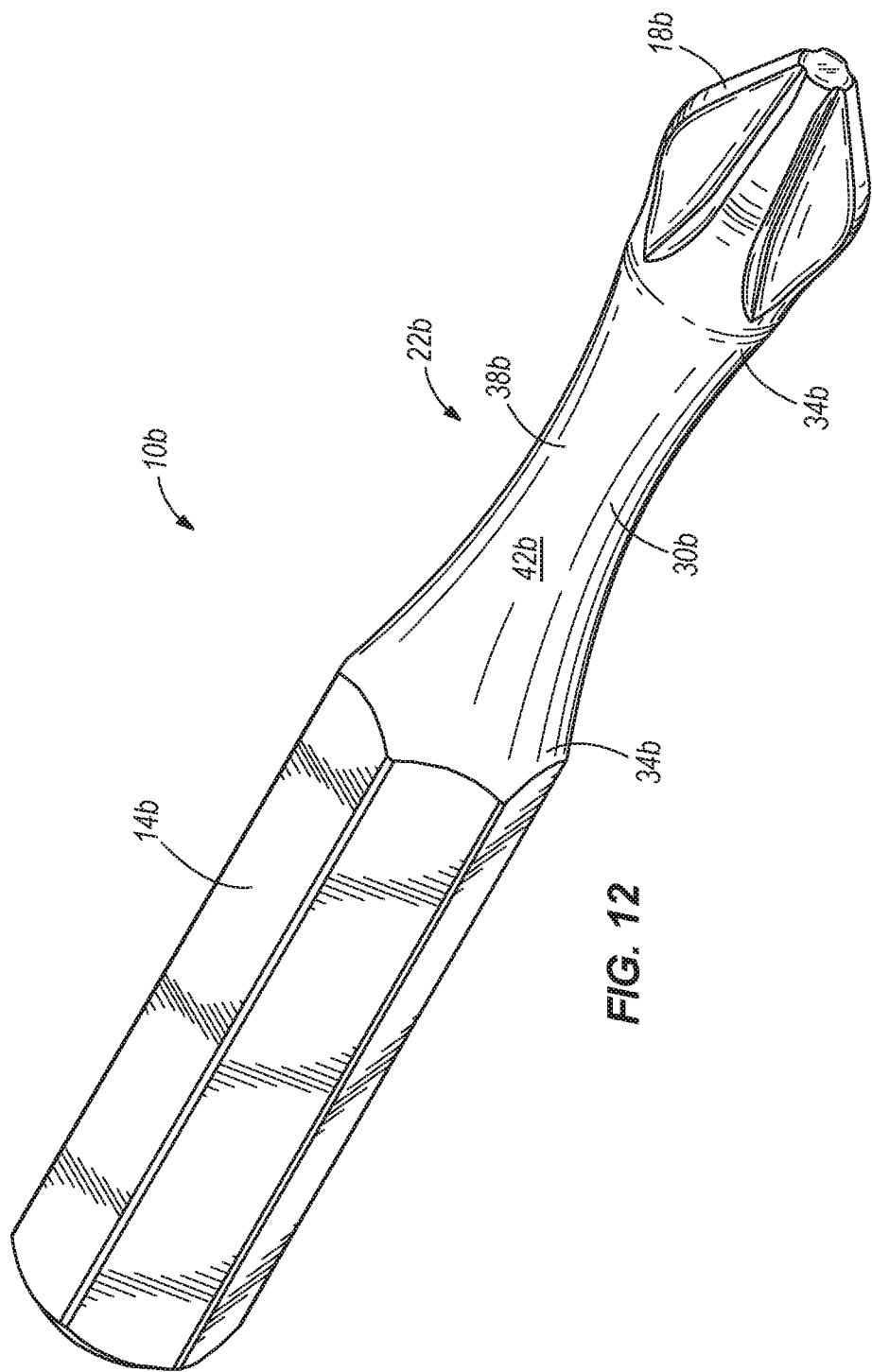
FIG. 12 is a perspective view of a tool bit according to another construction of the invention.
Figure 13:
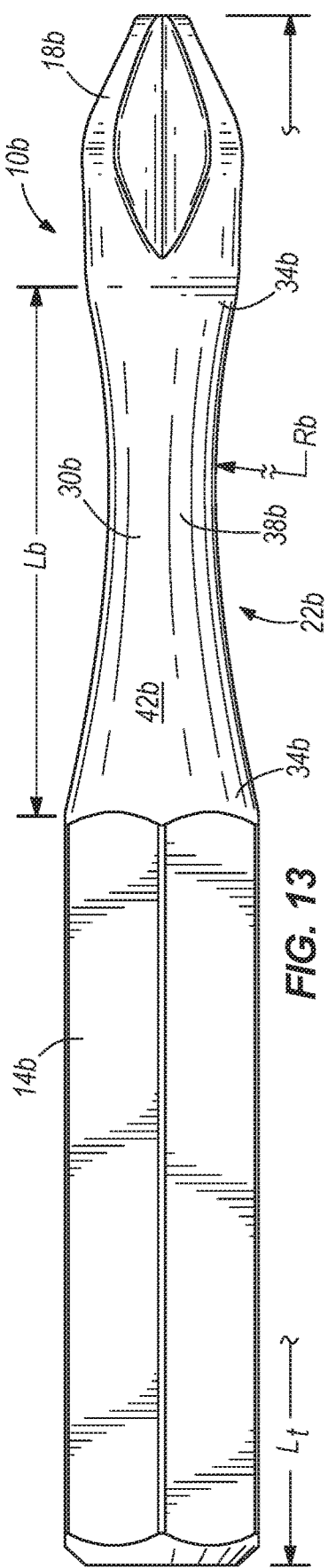
FIG. 13 is a side view of the tool bit of FIG. 12.
Figure 14:
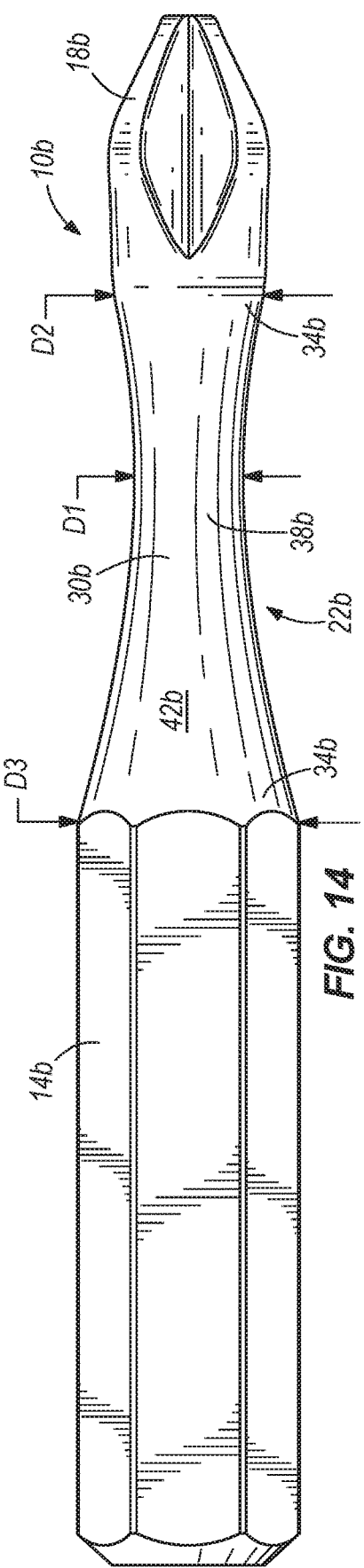
FIG. 14 is a top view of the tool bit of FIG. 12.
Figure 15:
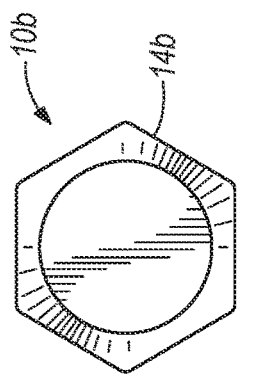
FIG. 15 is a front view of the tool bit of FIG. 12.
Figure 16:
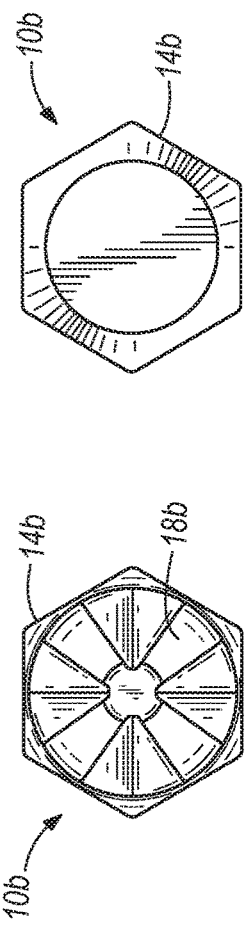
FIG. 16 is a rear view of the tool bit of FIG. 12.

FIGS. 7-11 illustrate another construction of an insert bit 10*a* similar to the insert bit 10 of FIGS. 1-6, with like components or features having like reference numerals including the letter "a." However, the identification band 50 is omitted in the insert bit 10*a* of FIGS. 7-11 (FIGS. 7-9). Rather, the concave portion 30*a* of the shank 22*a* extends across the entire length La of the shank 22*a*. Also, the diameter D3 of the end portion 34*a* adjacent the drive portion 14*a* is larger than the diameter D2 of the end portion 34*a* adjacent the tip 18*a*. Specifically, the diameter D1 of the mid-portion 38*a* is about 55% of the diameter D3 of the end portion 34*a* adjacent the drive portion 14*a*. Alternatively, the diameter D1 may be about 45% to about 65% of the diameter D3. The relative values between D1 and D2 for the insert bit 10*a* are similar to those for the insert bit 10. As a further alternative, the diameters D2, D3 may be substantially equal. The diameter D1 of the mid-portion 38*a* may be as large as about 0.236 inches. Alternatively, the diameter D1 of the mid-portion 38*a* may be as small as about 0.1 inches. The method of manufacturing the insert bit 10*a* and the manner of operation of the insert bit 10*a* are substantially similar to that described above with respect to the insert bit 10.

FIGS. 12-16 illustrate another construction of an insert bit 10*b* similar to the insert bits 10, 10*a* of FIGS. 1-6 and 7-11, respectively, with like components or features having like reference numerals including the letter "b." The identification band 50 is omitted in the insert bit 10*b* of FIGS. 12-16, and the groove of the drive portion (FIGS. 1-3 and FIGS. 7-9) is omitted in the insert bit 10*b* of FIGS. 12-16. Like the insert bit 10*a* of FIGS. 7-11, the concave portion 30*b* of the shank 22*b* extends across the entire length Lb of the shank 22*b*. The method of manufacturing the insert bit 10*b* and the manner of operation of the insert bit 10*b* are substantially similar to that described above with respect to the insert bit 10. However, the insert bit 10*b* may not be utilized with a driver incorporating quick-release structure (e.g., a ball detent) because of the omission of the groove 26 in the drive portion 14*b*. The insert bit 10*b* may, however, be utilized with a driver employing an interference fit to secure the insert bit 10*b* to the driver.

FIGS. 17 and 18 illustrate another construction of an insert bit 10*c* similar to the insert bit 10 of FIGS. 1-6, with like components or features having like reference numerals with a letter "c." The insert bit 10*c* is configured with a shorter overall length Lt than that of the insert bit 10. Specifically, the length of the drive portion 14*c* is less than the length of the drive portion 14 of the insert bit 10, and the length Lc of the concave portion 30*c* is less than the length L of the concave portion 30 of the insert bit 10. Also, the groove 26 is omitted in the drive portion 14*c* the insert bit 10*c*, such that the insert bit 10*c* may not be utilized with a driver incorporating a quick-release structure (e.g., a ball detent). The insert bit 10*c* may, however, be utilized with a driver employing an interference fit to secure the insert bit 10*c* to the driver.

Specifically, the insert bit 10*c* of FIGS. 17 and 18 is configured having an overall length Lt of about 1 inch. The curvature of the concave portion 30*c* is defined by a radius Rc of about 0.08 inches to about 0.75 inches, and the length Lc of the concave portion 30*c* of the shank 22*c* is about 0.15 inches to about 0.35 inches. Therefore, a ratio of the radius Rc of the concave portion 30*c* to the overall length Lt is about 0.08 to about 0.75, and a ratio of the length Lc of the concave portion 30*c* of the shank 22*c* to the overall length Lt is about 0.15 to about 0.35. The diameter D1 of the mid-portion 38*c* may be as large as about 0.236 inches. Alternatively, the diameter D1 of the mid-portion 38*c* may be as small as about 0.1 inches. The method of manufacturing the insert bit 10*c* and the manner of operation of the insert bit 10*c* are substantially similar to that described above with respect to the insert bit 10.

Figure 20:
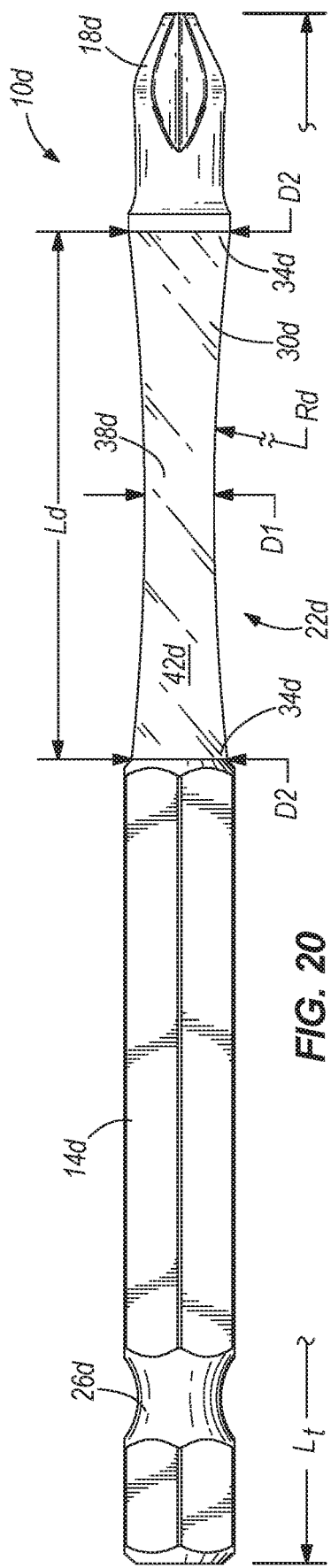
FIG. 20 is a side view of the tool bit of FIG. 19.
Figure 22:
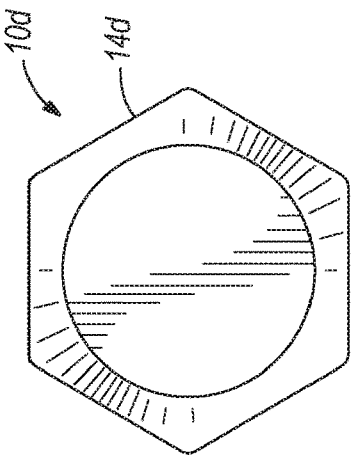
FIG. 22 is a rear view of the tool bit of FIG. 19.

FIGS. 19-22 illustrate another construction of a tool bit or an insert bit 10*d* including a hexagonal drive portion 14*d*, a head or tip 18*d* configured to engage a fastener, and a shank 22*d* interconnecting the drive portion 14*d* and the tip 18*d*. The hexagonal drive portion 14*d* is intended to be engaged by any of a number of different tools, adapters, or components to receive torque from the tool, adapter, or component to rotate the insert bit 10*d*. For example, the insert bit 10*d* may be utilized with a driver including a socket (not shown) having a corresponding hexagonal recess in which the hexagonal drive portion 14*d* of the insert bit 10*d* is received. The driver may also include a stem extending from the socket, which may be coupled to a handle for hand-use by an operator or to a chuck of a power tool (e.g., a drill) for powered use by the operator. An interference fit between the hexagonal drive portion 14*d* of the insert bit 10*d* and the socket may be used to axially secure the insert bit 10*d* to the driver. Alternatively, a quick-release structure may be employed to axially secure the insert bit 10*d* to the driver. With reference to FIGS. 19 and 20, the drive portion 14*d* of the insert bit 10*d* includes a groove 26*d* into which the quick-release structure (e.g., a ball detent) may be positioned to axially secure the insert bit 10d to the driver. Alternatively, the groove 26d may be omitted from the drive portion 14d of the insert bit 10d should an interference fit between the socket and the drive portion 14d be employed.

Figure 21:
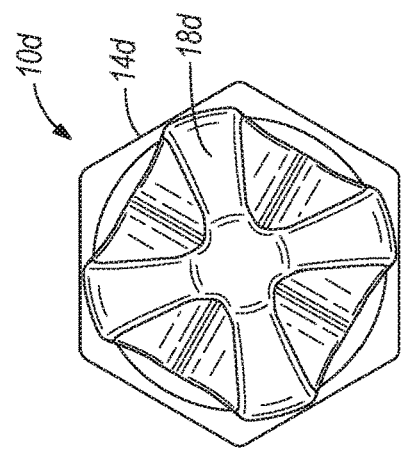
FIG. 21 is a front view of the tool bit of FIG. 19.

With continued reference to FIGS. 19 and 20, the tip 18d of the insert bit 10d is configured as a Philips-style tip 18d (see also FIG. 21). Alternatively, the tip 18d of the insert bit 10d may be differently configured to engage different style fasteners. For example, the tip 18d of the insert bit 10d may be configured as a straight blade (otherwise known as a "regular head") to engage fasteners having a corresponding straight slot.

With reference to FIG. 20, a portion 30d of the shank 22d is concave, including opposite end portions 34d and a reduced diameter mid-portion 38d. The concave portion 30d of the shank 22d includes an outer peripheral surface 42d having a curvature in a plane including a central axis 46d (FIG. 19) of the insert bit 10d (i.e., in a plane parallel to the plane of the page of FIG. 20). In a configuration of the insert bit 10d having an overall length Lt of about 3.5 inches, the curvature is defined by a radius Rd of about 3 inches to about 50 inches. More particularly, in a configuration of the insert bit 10d having an overall length Lt of about 3.5 inches, the curvature is defined by a radius Rd of about 5 inches to about 5.5 inches. In other words, in a configuration of the insert bit 10d having an overall length Lt of about 3.5 inches, a ratio of the radius Rd of the curvature of the outer peripheral surface 42d of the shank 22d to the length Lt of the insert bit 10d is between about 0.50:1 and about 14.3:1. More particularly, in a configuration of the insert bit 10d having an overall length Lt of about 3.5 inches, a ratio of the radius Rd of the curvature of the outer peripheral surface 42d of the shank 22d to the length Lt of the insert bit 10d is between about 1.25:1 and about 1.75:1.

With continued reference to FIG. 20, in a configuration of the insert bit 10d having an overall length Lt of about 3.5 inches, a ratio of the length Ld of the concave portion 30d of the shank 22d to the overall length Lt of the insert bit 10d is about 0.2:1 to about 0.7:1. More particularly, in a configuration of the insert bit 10d having an overall length Lt of about 3.5 inches, a ratio of the length Ld of the concave portion 30d of the shank 22d to the overall length Lt of the insert bit 10d is about 0.3:1 to about 0.4:1. Considering the above ratios of the radius Rd to the length Lt, a ratio of the radius Rd of the curvature of the outer peripheral surface 42d of the shank 22d to the length Ld of the concave portion 30d of the shank 22d is between about 0.7:1 and about 71.5:1. More particularly, in a configuration of the insert bit 10d having an overall length Lt of about 3.5 inches, the ratio of the radius Rd of the curvature of the outer peripheral surface 42d of the shank 22d to the length Ld of the concave portion 30d of the shank 22d is between about 3.1:1 and about 5.8:1. Also, in a configuration of the insert bit 10d having an overall length Lt of about 3.5 inches, a ratio of the diameter D1 of the mid-portion 38d to the diameter D2 of each of the end portions 34d is about 0.7:1 to about 0.8:1. The diameter D1 of the mid-portion 38d may be as large as about 0.236 inches. Alternatively, the diameter D1 of the mid-portion 38d may be as small as about 0.1 inches.

With reference to FIGS. 19 and 20, the drive portion 14d and the tip 18d are coated with a layer or coating (e.g., manganese phosphate, etc.) to inhibit corrosion of the insert bit 10d. In addition, the concave portion 30d of the shank 22d is at least partially polished to a surface finish of at least about 2 microns to remove the coating from the shank 22d. Alternatively, the concave portion 30d of the shank 22d may be polished to a surface finish of about 1 micron to about 2 microns to remove the coating from the shank 22d. In the illustrated construction of the insert bit 10d, the shank 22d is polished along the entire length of the outer peripheral surface 42d of the shank 22d having the curvature Rd (i.e., the concave portion 30d). Alternatively, less of the concave portion 30d may be polished than what is shown in FIGS. 19 and 20.

The insert bit 10d is manufactured from bar stock having a hexagonal cross-section. The tip 18d of the insert bit 10d is forged, and the concave portion 30d of the shank 22d is machined to a particular length Ld and a particular radius Rd (FIG. 20) to facilitate elastic deformation of the concave portion 30d of the shank 22d when the insert bit 10d is utilized with an impact driver. Alternatively, any of a number of different manufacturing processes may be employed to create the insert bit 10d. The insert bit 10d is then heat treated using a tempering process to a hardness range between about 52 HRC and about 60 HRC. Alternatively, the insert bit 10d may be heat treated to a hardness range between about 54 HRC and about 59 HRC The same heat treating process is applied to the entire length of the insert bit 10d, such that the resultant hardness of the insert bit 10d is substantially uniform or non-varying, within a tolerance value, along the entire length of the insert bit 10d. In other words, the hardness of the concave portion 30d of the shank 22d is similar to that of the tip 18d and the drive portion 14d of the insert bit 10d. Alternatively, a heat treating process may be employed to impart a varying hardness along the length of the insert bit 10d. Particularly, the shank 22d may be heat treated such that the hardness of the shank 22d varies along the length Ld of the concave portion 30d.

After the insert bit 10d is heat treated, the corrosion-resistant coating or layer (e.g., manganese phosphate, etc.) is applied to the entire insert bit 10d to inhibit corrosion of the insert bit 10d. The corrosion-resistant coating or layer may be applied in any of a number of different ways (e.g., using a spraying or dipping process, plating, painting, steam tempering, etc.). After the insert bit 10d is coated, the concave portion 30d of the shank 22d is polished to a surface finish of at least about 2 microns to remove the corrosion-resistant coating or layer from the shank 22d. In the illustrated construction of the insert bit 30d, the concave portion 30d is polished using an abrasive paper or sandpaper. Alternatively, the concave portion 30d may be polished in any of a number of different manners (e.g., by electroplating, bead-blasting, using a vibration process with abrasives, etc.).

In operation of the insert bit 10d, the concave portion 30d of the shank 22d is configured to increase the impact resistance or the toughness of the insert bit 10d, such that the tip 18d of the insert bit 10d is allowed to elastically deform or twist relative to the drive portion 14d about the central axis 46d of the insert bit 10d. Specifically, the polar moment of inertia of the shank 22d is decreased by incorporating the concave portion 30d, thereby reducing the amount of torsion required to elastically twist the shank 22d, compared to a configuration of the shank 22d having a cylindrical shape (i.e., without the reduced diameter mid-portion 38d). By polishing the concave portion 30d of the shank 22d, the number and size of the microcracks in the concave portion 30d of the shank 22d are reduced, which otherwise might result in undesirably high stress risers in the concave portion 30d that could ultimately shorten the useful life of the insert bit 10d when used in an impact application.

Figure 23:
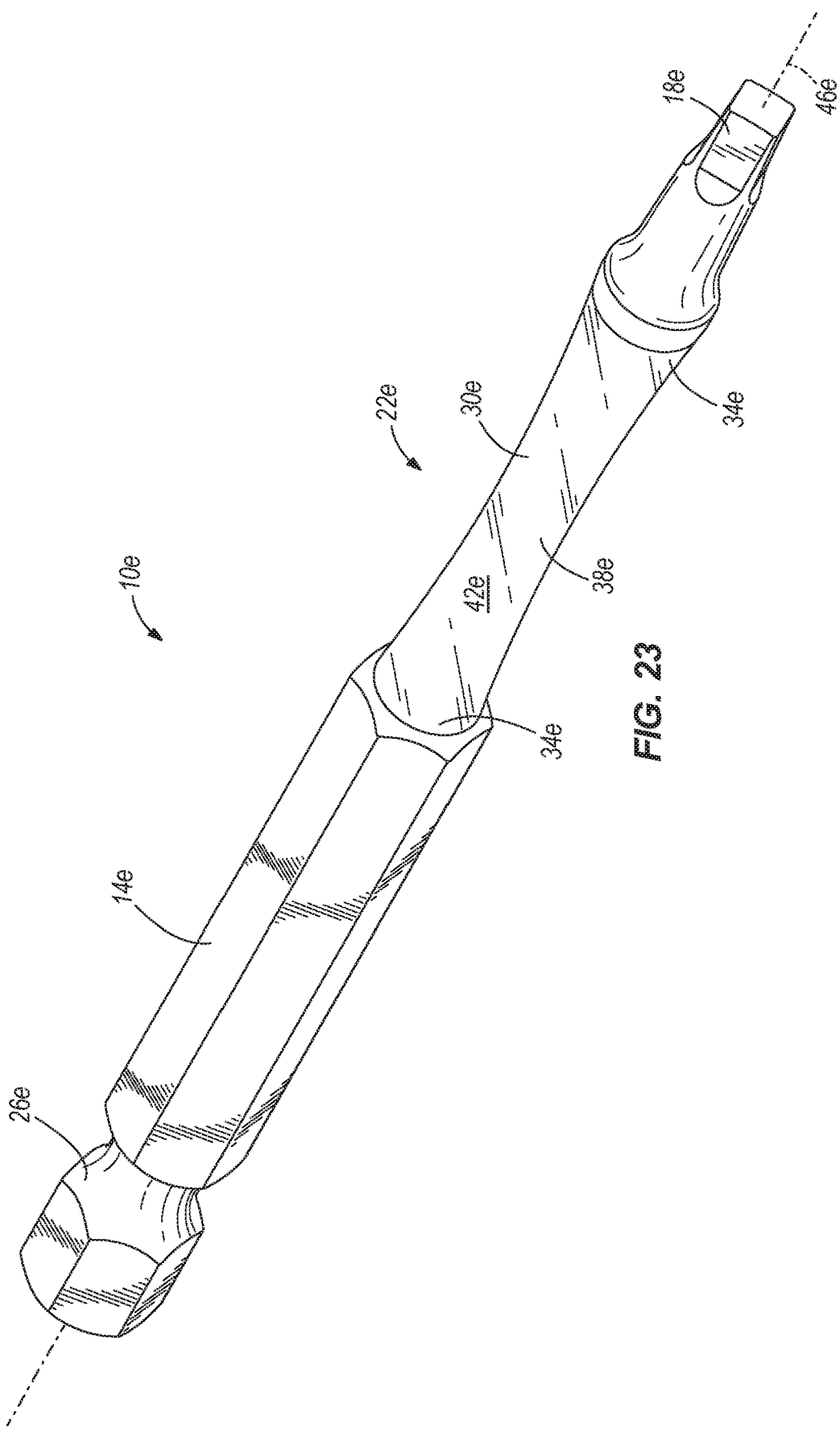
FIG. 23 is a perspective view of a tool bit according to another construction of the invention.

FIGS. 23-26 illustrate another construction of a tool bit or an insert bit 10e similar to the insert bit 10d of FIGS. 19-22, with like components or features having like reference numerals including the letter "e." With reference to FIGS. 23-25, the tip 18e of the insert bit 10e is configured as a square tip 18d configured to be received within a fastener having a square recess.

In a configuration of the insert bit 10e having an overall length Lt of about 3.5 inches, the curvature of the concave portion 30e is defined by a radius Re of about 3 inches to about 50 inches (FIG. 24). More particularly, in a configuration of the insert bit 10e having an overall length Lt of about 3.5 inches, the curvature of the concave portion 30e is defined by a radius Re of about 5 inches to about 5.5 inches. In other words, in a configuration of the insert bit 10e having an overall length Lt of about 3.5 inches, a ratio of the radius Re of the curvature of the outer peripheral surface 42e of the shank 22e to the length Lt of the insert bit 10e is between about 0.50:1 and about 14.3:1. More particularly, in a configuration of the insert bit 10e having an overall length Lt of about 3.5 inches, a ratio of the radius Re of the curvature of the outer peripheral surface 42e of the shank 22e to the length Lt of the insert bit 10e is between about 1.25:1 and about 1.75:1.

With continued reference to FIG. 24, in a configuration of the insert bit 10e having an overall length Lt of about 3.5 inches, a ratio of the length Le of the concave portion 30e of of the shank 22e to the overall length Lt of the insert bit 10e is is about 0.2:1 to about 0.7:1. More particularly, in a configuration of the insert bit 10e having an overall length Lt of about 3.5 inches, a ratio of the length Le of the concave portion 30e of the shank 22e to the overall length Lt of the insert bit 10e is about 0.3:1 to about 0.4:1. Considering the above ratios of the radius Re to the length Lt, a ratio of the radius Re of the curvature of the outer peripheral surface 42e of the shank 22e to the length Le of the concave portion 30e of the shank 22e is between about 0.7:1 and about 71.5:1. More particularly, in a configuration of the insert bit 10e having an overall length Lt of about 3.5 inches, the ratio of the radius Re of the curvature of the outer peripheral surface 42e of the shank 22e to the length Le of the concave portion 30e of the shank 22e is between about 3.1:1 and about 5.8:1. Also, in a configuration of the insert bit 10e having an overall length Lt of about 3.5 inches, a ratio of the diameter D1 of the mid-portion 38e to the diameter D2 of each of the end portions 34e is about 0.7:1 to about 0.8:1. The diameter D1 of the mid-portion 38e may be as large as about 0.236 inches. Alternatively, the diameter D1 of the mid-portion 38e may be as small as about 0.1 inches.

Like the insert bit 10d, the drive portion 14e and the tip 18e of the insert bit 10e are coated with a layer or coating (e.g., manganese phosphate, etc.) to inhibit corrosion of the insert bit 10e. In addition, the concave portion 30e of the shank 22e is at least partially polished to a surface finish of at least about 2 microns to remove the coating from the shank 22e. Alternatively, the concave portion 30e of the shank 22e may be polished to a surface finish of about 1 micron to about 2 microns to remove the coating from the shank 22e. In the illustrated construction of the insert bit 10e, the shank 22e is polished along the entire length of the outer peripheral surface 42e of the shank 22e having the curvature Re (i.e., the concave portion 30e). The method of manufacturing the insert bit 10e and the manner of operation of the insert bit 10e are substantially similar to that described above with respect to the insert bit 10d.

Figure 27:
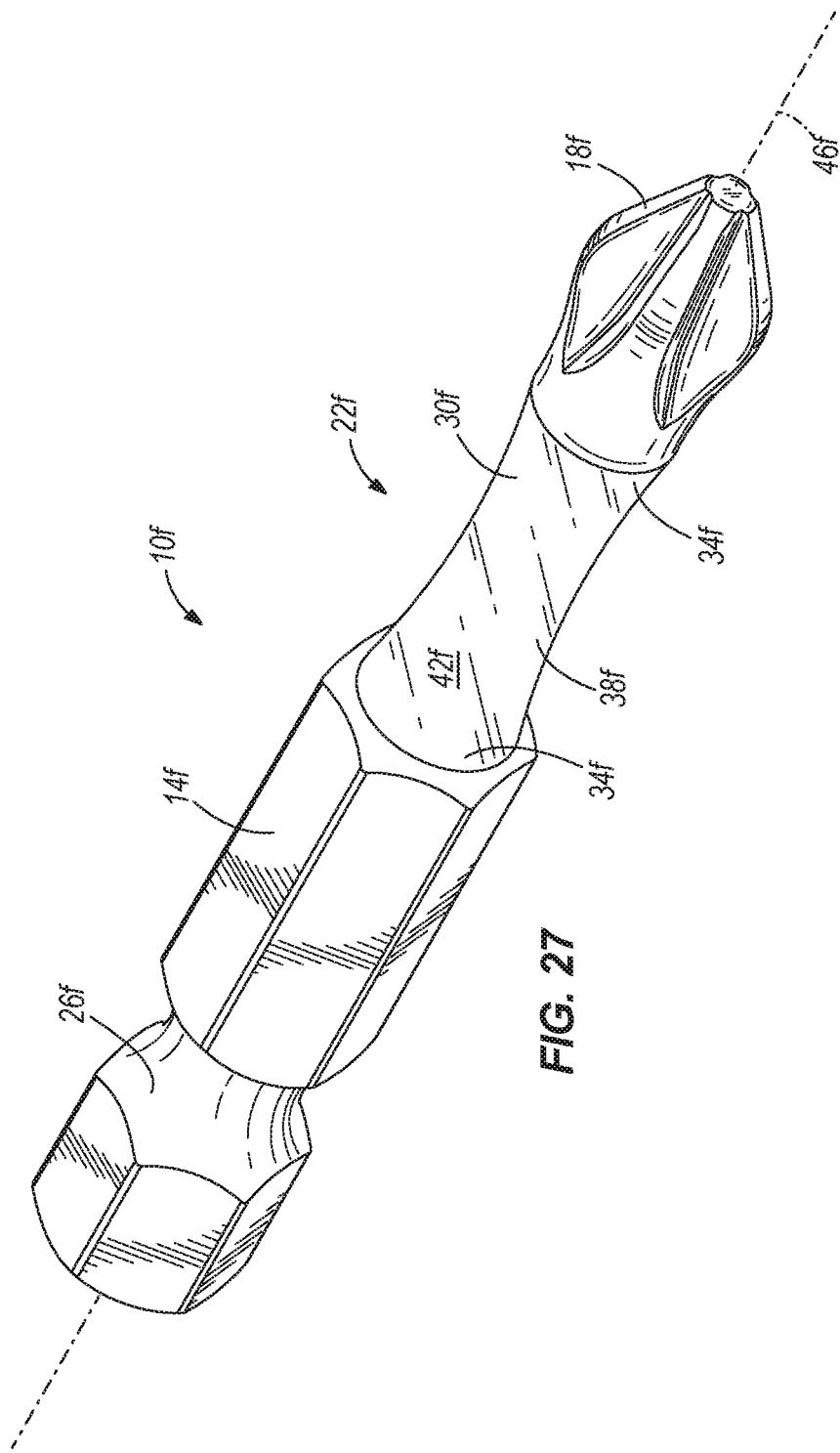
FIG. 27 is a perspective view of a tool bit according to another construction of the invention.
Figure 28:
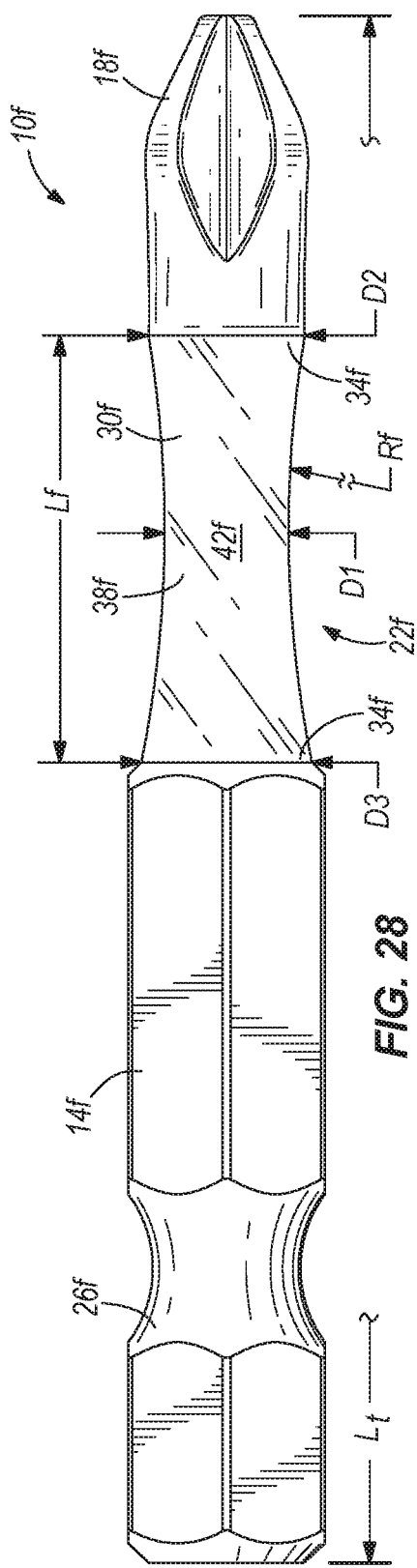
FIG. 28 is a side view of the tool bit of FIG. 27.
Figure 30:
FIG. 30 is a rear view of the tool bit of FIG. 27.
Figure 29:
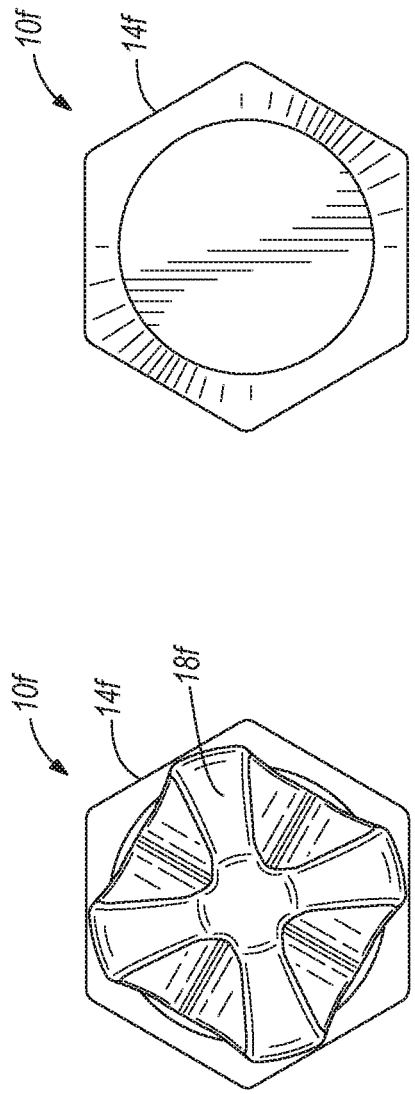
FIG. 29 is a front view of the tool bit of FIG. 27.

FIGS. 27-30 illustrate another construction of a tool bit or an insert bit 10f similar to the insert bit 10d of FIGS. 19-22, with like components or features having like reference numerals including the letter "f." With reference to FIGS. 27-29, the tip 18e of the insert bit 10e is configured as a Philips-style tip 18f. Alternatively, the tip 18f may be differently configured to engage different style fasteners. For example, the tip 18f may be configured as a straight blade (otherwise known as a "regular head") to engage fasteners having a corresponding straight slot.

In a configuration of the insert bit 10f having an overall length Lt of about 2 inches, the curvature of the concave portion 30f is defined by a radius Rf of about 1 inch to about 2 inches (FIG. 28). More particularly, in a configuration of the insert bit 10f having an overall length Lt of about 2 inches, the curvature of the concave portion 30f is defined by a radius Rf of about 1.5 inches. In other words, in a configuration of the insert bit 10f having an overall length Lt of about 2 inches, a ratio of the radius Rf of the curvature of the outer peripheral surface 42f of the shank 22f to the length Lt of the insert bit 10f is between about 0.50:1 and about 2:1. More particularly, in a configuration of the insert bit 10f having an overall length Lt of about 2 inches, a ratio of the radius Rf of the curvature of the outer peripheral surface 42f of the shank 22f to the length Lt of the insert bit 10f is between about 0.5:1 and about 1:1.

With continued reference to FIG. 28, in a configuration of the insert bit 10f having an overall length Lt of about 2 inches, a ratio of the length Lf of the concave portion 30f of the shank 22f to the overall length Lt of the insert bit 10f is about 0.2:1 to about 0.6:1. More particularly, in a configuration of the insert bit 10f having an overall length Lt of about 2 inches, a ratio of the length Lf of the concave portion 30f of the shank 22f to the overall length Lt of the insert bit 10f is about 0.2 inches to about 0.3 inches. Considering the above ratios of the radius Rf to the length Lt, a ratio of the radius Rf of the curvature of the outer peripheral surface 42f of the shank 22f to the length Lf of the concave portion 30f of the shank 22f is between about 0.8:1 and about 10:1. More particularly, in a configuration of the insert bit 10f having an overall length Lt of about 2 inches, the ratio of the radius Rf of the curvature of the outer peripheral surface 42f of the shank 22f to the length Lf of the concave portion 30f of the shank 22f is between about 1.7:1 and about 5:1.

With continued reference to FIG. 28, in a configuration of the insert bit 10f having an overall length Lt of about 2 inches, a ratio of the diameter D1 of the mid-portion 38f to the diameters D2, D3 of the end portions 34f is about 0.7:1 to about 0.9:1. Similar to the insert bit 10a, the diameter D3 of the end portion 34f adjacent the drive portion 14f is larger than the diameter D2 of the end portion 34f adjacent the tip 18f. A ratio of the diameter D1 of the mid-portion 38f to the diameter D3 of the end portion 34f adjacent the drive portion 14f is about 0.75:1, while a ratio of the diameter D1 of the mid-portion 38f to the diameter D2 of the end portion 34f adjacent the tip 18f is about 0.83:1. Alternatively, the diameters D2, D3 may be substantially equal. The diameter D1 of the mid-portion 38f may be as large as about 0.236 inches. Alternatively, the diameter D1 of the mid-portion 38f may be as small as about 0.1 inches.

Like the insert bit 10d, the drive portion 14f and the tip 18f of the insert bit 10f are coated with a layer or coating (e.g., manganese phosphate, etc.) to inhibit corrosion of the insert bit 10f. In addition, the concave portion 30f of the shank 22f is at least partially polished to a surface finish of at least about 2 microns to remove the coating from the shank 22f. Alternatively, the concave portion 30f of the shank 22f may be polished to a surface finish of about 1 micron to about 2 microns to remove the coating from the shank 22f. In the illustrated construction of the insert bit 10f, the shank 22f is polished along the entire length of the outer peripheral surface 42f of the shank 22f having the curvature Rf (i.e., the concave portion 300. The method of manufacturing the insert bit 10f and the manner of operation of the insert bit 10f are substantially similar to that described above with respect to the insert bit 10d.

Figure 31:
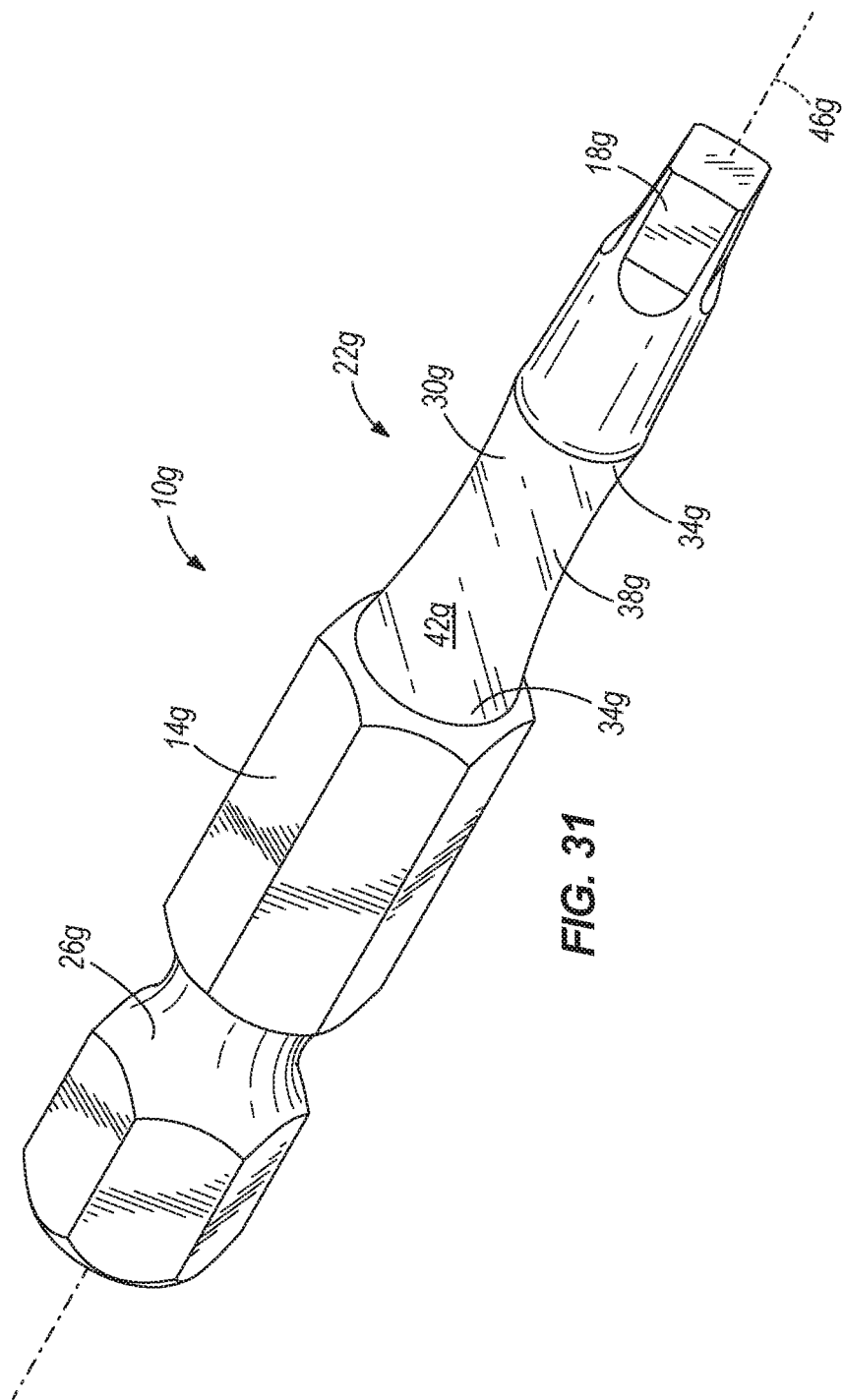
FIG. 31 is a perspective view of a tool bit according to yet another construction of the invention.

FIGS. 31-34 illustrate another construction of a tool bit or an insert bit 10g similar to the insert bit 10f of FIGS. 27-30, with like components or features having like reference numerals including the letter "g." With reference to FIGS. 31-33, the tip 18g of the insert bit 10g is configured as a square tip 18g configured to be received within a fastener having a square recess.

In a configuration of the insert bit 10g having an overall length Lt of about 2 inches, the curvature of the concave portion 30g is defined by a radius Rg of about 1 inch to about 2 inches (FIG. 32). More particularly, in a configuration of the insert bit 10g having an overall length Lt of about 2 inches, the curvature of the concave portion 30g is defined by a radius Rg of about 1.5 inches. In other words, in a configuration of the insert bit 10g having an overall length Lt of about 2 inches, a ratio of the radius Rg of the curvature of the outer peripheral surface 42g of the shank 22g to the length Lt of the insert bit 10g is between about 0.50:1 and about 2:1. More particularly, in a configuration of the insert bit 10g having an overall length Lt of about 2 inches, a ratio of the radius Rg of the curvature of the outer peripheral surface 42g of the shank 22g to the length Lg of the insert bit 10g is between about 0.5:1 and about 1:1.

With continued reference to FIG. 32, in a configuration of the insert bit 10g having an overall length Lt of about 2 inches, a ratio of the length Lg of the concave portion 30g of the shank 22g to the overall length Lt of the insert bit 10g is about 0.2:1 to about 0.6:1. More particularly, in a configuration of the insert bit 10g having an overall length Lt of about 2 inches, a ratio of the length Lg of the concave portion 30g of the shank 22g to the overall length Lt of the insert bit 10g is about 0.2:1 to about 0.3:1. Considering the above ratios of the radius Rg to the length Lt, a ratio of the radius Rg of the curvature of the outer peripheral surface 42g of the shank 22g to the length Lg of the concave portion 30g of the shank 22g is between about 0.8:1 and about 10:1. More particularly, in a configuration of the insert bit 10g having an overall length Lt of about 2 inches, the ratio of the radius Rg of the curvature of the outer peripheral surface 42g of the shank 22g to the length Lg of the concave portion 30g of the shank 22g is between about 1.7:1 and about 5:1.

With continued reference to FIG. 32, in a configuration of the insert bit 10g having an overall length Lt of about 2 inches, a ratio of the diameter D1 of the mid-portion 38g to the diameters D2, D3 of the end portions 34g is about 0.7:1 to about 0.9:1. Similar to the insert bit 10f, the diameter D3 of the end portion 34g adjacent the drive portion 14g is larger than the diameter D2 of the end portion 34g adjacent the tip 18g. Specifically, a ratio of the diameter D1 of the mid-portion 38g to the diameter D3 of the end portion 34g adjacent the drive portion 14g is about 0.74:1, while a ratio of the diameter D1 of the mid-portion 38g to the diameter D2 of the end portion 34g adjacent the tip 18g is about 0.85:1. Alternatively, the diameters D2, D3 may be substantially equal. The diameter D1 of the mid-portion 38g may be as large as about 0.236 inches. Alternatively, the diameter D1 of the mid-portion 38g may be as small as about 0.1 inches.

Like the insert bit 10f, the drive portion 14g and the tip 18g of the insert bit 10g are coated with a layer or coating (e.g., manganese phosphate, etc.) to inhibit corrosion of the insert bit 10g. In addition, the concave portion 30g of the shank 22g is at least partially polished to a surface finish of at least about 2 microns to remove the coating from the shank 22g. Alternatively, the concave portion 30g of the shank 22g may be polished to a surface finish of about 1 micron to about 2 microns to remove the coating from the shank 22g. In the illustrated construction of the insert bit 10g, the shank 22g is polished along the entire length of the outer peripheral surface 42g of the shank 22g having the curvature Rg (i.e., the concave portion 30g). The method of manufacturing the insert bit 10g and the manner of operation of the insert bit 10g are substantially similar to that described above with respect to the insert bit 10d.

Figure 35:
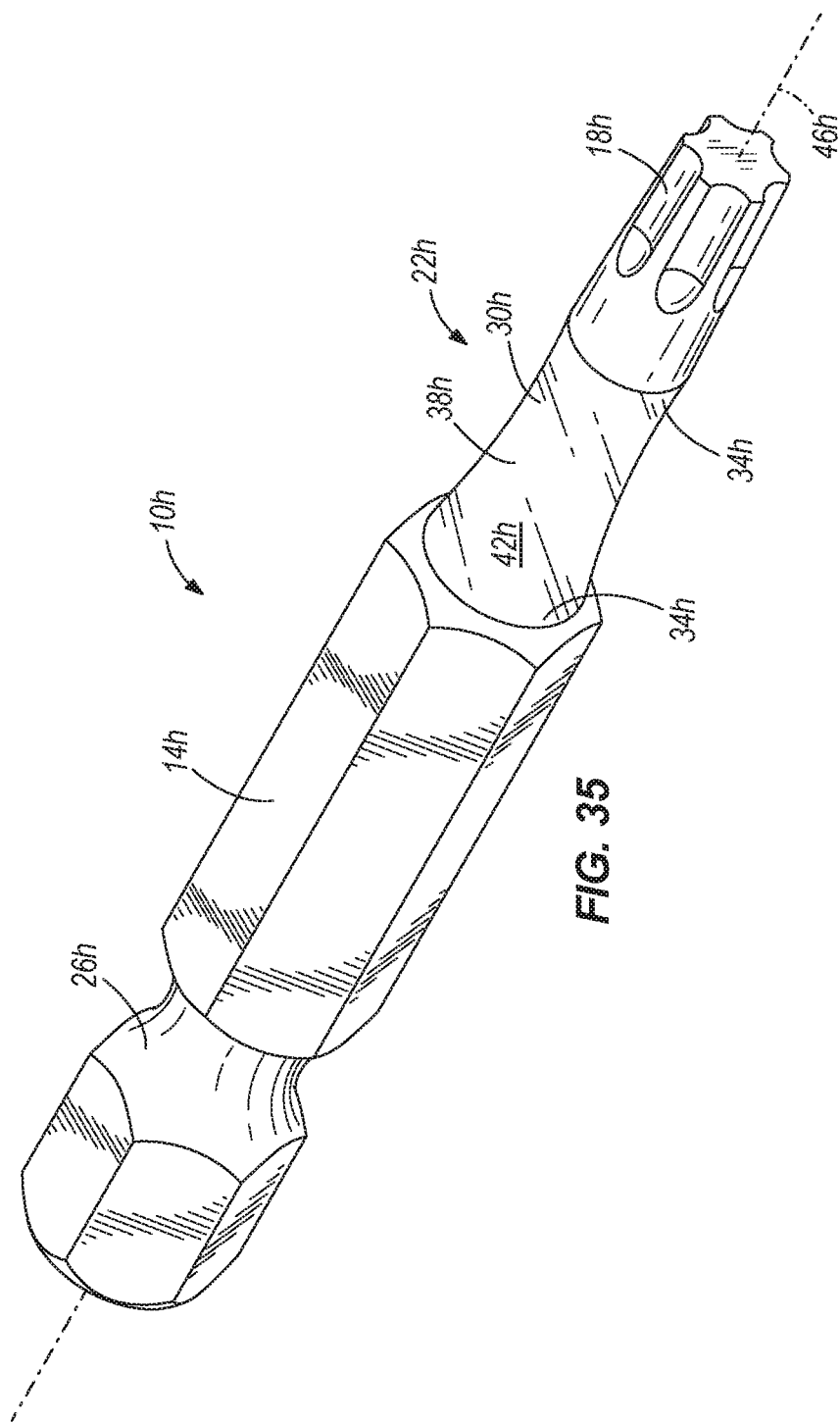
FIG. 35 is a perspective view of a tool bit according to yet another construction of the invention.

FIGS. 35-38 illustrate another construction of a tool bit or an insert bit 10h similar to the insert bit 10f of FIGS. 27-30, with like components or features having like reference numerals including the letter "h." With reference to FIGS. 35-37, the tip 18h of the insert bit 10h is configured as a TORX screw tip 18g.

In a configuration of the insert bit 10h having an overall length Lt of about 2 inches, the curvature of the concave portion 30h is defined by a radius Rh of about 1 inch to about 2 inches (FIG. 36). More particularly, in a configuration of the insert bit 10h having an overall length Lt of about 2 inches, the curvature of the concave portion 30h is defined by a radius Rh of about 1.5 inches. In other words, in a configuration of the insert bit 10h having an overall length Lt of about 2 inches, a ratio of the radius Rh of the curvature of the outer peripheral surface 42h of the shank 22h to the length Lt of the insert bit 10h is between about 0.50:1 and about 2:1. More particularly, in a configuration of the insert bit 10h having an overall length Lt of about 2 inches, a ratio of the radius Rh of the curvature of the outer peripheral surface 42h of the shank 22h to the length Lh of the insert bit 10h is between about 0.5:1 and about 1:1.

With continued reference to FIG. 36, in a configuration of the insert bit 10h having an overall length Lt of about 2 inches, a ratio of the length Lh of the concave portion 30h of the shank 22h to the overall length Lt of the insert bit 10h is about 0.2:1 to about 0.6:1. More particularly, in a configuration of the insert bit 10h having an overall length Lt of about 2 inches, a ratio of the length Lh of the concave portion 30h of the shank 22h to the overall length Lt of the insert bit 10h is about 0.2:1 to about 0.3:1. Considering the above ratios of the radius Rh to the length Lt, a ratio of the radius Rh of the curvature of the outer peripheral surface 42h of the shank 22h to the length Lh of the concave portion 30h of the shank 22h is between about 0.8:1 and about 10:1. More particularly, in a configuration of the insert bit 10h having an overall length Lt of about 2 inches, the ratio of the radius Rh of the curvature of the outer peripheral surface 42h of the shank 22h to the length Lh of the concave portion 30h of the shank 22h is between about 1.7:1 and about 5:1.

With continued reference to FIG. 36, in a configuration of the insert bit 10h having an overall length Lt of about 2 inches, a ratio of the diameter D1 of the mid-portion 38h to the diameters D2, D3 of the end portions 34h is about 0.7:1 to about 0.95:1. Similar to the insert bit 10f, the diameter D3 of the end portion 34h adjacent the drive portion 14h is larger than the diameter D2 of the end portion 34h adjacent the tip 18h. Specifically, a ratio of the diameter D1 of the mid-portion 38h to the diameter D3 of the end portion 34h adjacent the drive portion 14h is about 0.74:1, while a ratio of the diameter D1 of the mid-portion 38h to the diameter D2 of the end portion 34h adjacent the tip 18h is about 0.95:1. Alternatively, the diameters D2, D3 may be substantially equal. The diameter D1 of the mid-portion 38h may be as large as about 0.236 inches. Alternatively, the diameter D1 of the mid-portion 38h may be as small as about 0.1 inches.

Like the insert bit 10f, the drive portion 14h and the tip 18h of the insert bit 10h are coated with a layer or coating (e.g., manganese phosphate, etc.) to inhibit corrosion of the insert bit 10h. In addition, the concave portion 30h of the shank 22h is at least partially polished to a surface finish of at least about 2 microns to remove the coating from the shank 22h. Alternatively, the concave portion 30h of the shank 22h may be polished to a surface finish of about 1 micron to about 2 microns to remove the coating from the shank 22h. In the illustrated construction of the insert bit 10h, the shank 22h is polished along the entire length of the outer peripheral surface 42h of the shank 22h having the curvature Rh (i.e., the concave portion 30h). The method of manufacturing the insert bit 10h and the manner of operation of the insert bit 10h are substantially similar to that described above with respect to the insert bit 10d.

FIGS. 39-42 illustrate another construction of a tool bit or an insert bit 10i including a hexagonal drive portion 14i, a head or tip 18i configured to engage a fastener, and a shank 22i interconnecting the drive portion 14i and the tip 18i. The insert bit 10i may be utilized with a driver including a socket (not shown) having a corresponding hexagonal recess in which the hexagonal drive portion 14i of the insert bit 10i is received. The driver may also include a stem extending from the socket, which may be coupled to a handle for hand-use by an operator, or to a chuck of a power tool (e.g., a drill) for powered use by the operator. An interference fit between the hexagonal drive portion 14i of the insert bit 10i and the socket may be used to axially secure the insert bit 10i to the driver.

Figure 39:
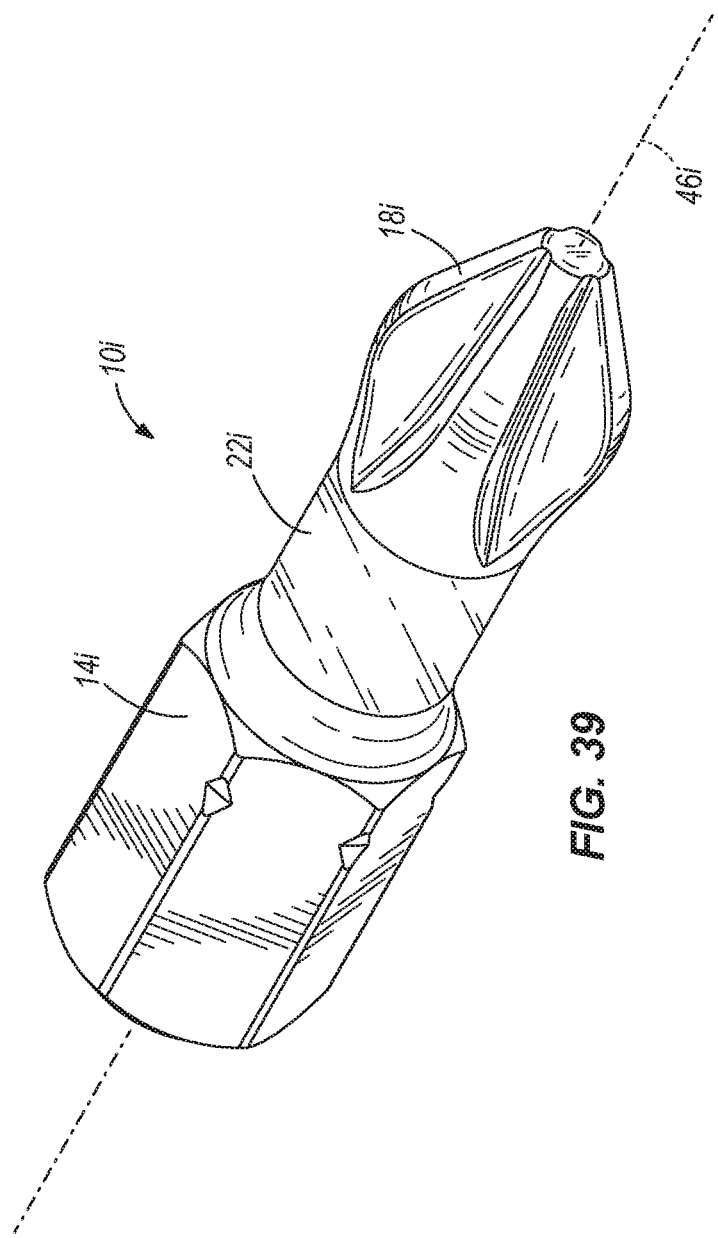
FIG. 39 is a perspective view of a tool bit according to one construction of the invention.
Figure 40:
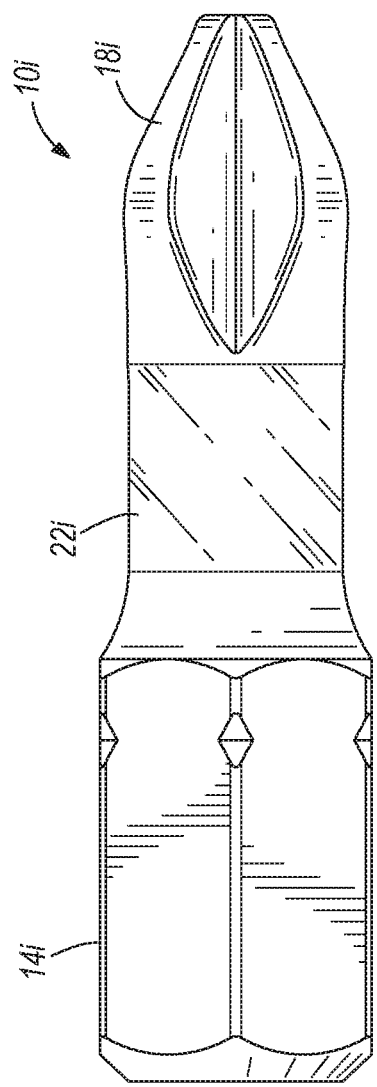
FIG. 40 is a side view of the tool bit of FIG. 39.
Figure 42:
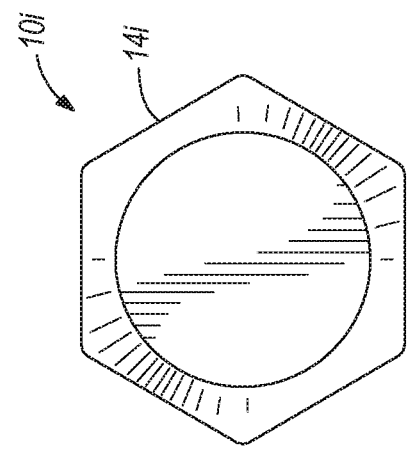
FIG. 42 is a rear view of the tool bit of FIG. 39.
Figure 41:
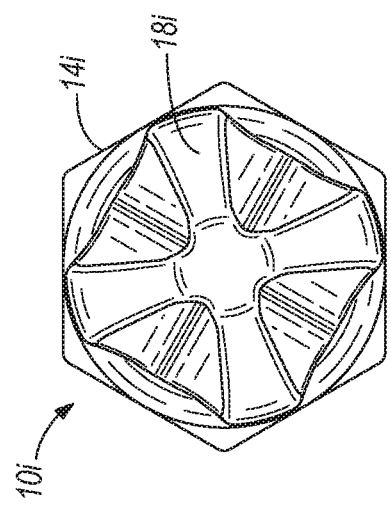
FIG. 41 is a front view of the tool bit of FIG. 39.

With reference to FIGS. 39-41, the tip 18i is configured as a Philips-style tip 18i. Alternatively, the tip 18i may be differently configured to engage different style fasteners. For example, the tip 18i may be configured as a straight blade (otherwise known as a "regular head") to engage fasteners having a corresponding straight slot.

With reference to FIGS. 39 and 40, the drive portion 14i and the tip 18i are coated with a layer or coating (e.g., manganese phosphate, etc.) to inhibit corrosion of the insert bit 10i. In addition, at least a portion of the shank 22i is polished to a surface finish of at least about 2 microns to remove the coating from the shank 22i. Alternatively, the shank 22i may be polished to a surface finish of about 1 micron to about 2 microns to remove the coating from the shank 22i.

The insert bit 10i is manufactured from bar stock having a hexagonal cross-section. The tip 18i of the insert bit 10i is forged, and the shank 22i is machined to a substantially cylindrical shape to facilitate elastic deformation of the shank 22i when the insert bit 10i is utilized with an impact driver. Alternatively, any of a number of different manufacturing processes may be employed to create the insert bit 10i. The insert bit 10i is then heat treated using a tempering process to a hardness range between about 52 HRC and about 60 HRC. Alternatively, the insert bit 10i may be heat treated to a hardness range between about 54 HRC and about 59 HRC. The same heat treating process is applied to the entire length of the insert bit 10i, such that the resultant hardness of the insert bit 10i is substantially uniform or non-varying, within a tolerance value, along the entire length of the insert bit 10i. Alternatively, a heat treating process may be employed to impart a varying hardness along the length of the insert bit 10i.

After the insert bit 10i is heat treated, the corrosion-resistant coating or layer (e.g., manganese phosphate, etc.) is applied to the entire insert bit 10i to inhibit corrosion of the insert bit 10i. The corrosion-resistant coating or layer may be applied in any of a number of different ways (e.g., using a spraying or dipping process, plating, painting, steam tempering, etc.). After the insert bit 10i is coated, a portion of the shank 22i is polished to a surface finish of at least about 2 microns to remove the corrosion-resistant coating or layer from the shank 22i. In the illustrated construction of the insert bit 10i, the shank 22i is polished using an abrasive paper or sandpaper. Alternatively, the shank 22i may be polished in any of a number of different manners (e.g., by electroplating, bead-blasting, using a vibration process with abrasives, etc.).

In operation of the insert bit 10i, the shank 22i is configured to increase the impact resistance or the toughness of the insert bit 10i, such that the tip 18i of the insert bit 10i is allowed to elastically deform or twist relative to the drive portion 14i about the central axis 46i of the insert bit 10i. Specifically, the polar moment of inertia of the shank 22i is less than that of the drive portion 14i, thereby reducing the amount of torsion required to elastically twist the shank 22i. By polishing the shank 22i, the number and size of the microcracks in the shank 22i are reduced, which otherwise might result in undesirably high stress risers in the shank 22i that could ultimately shorten the useful life of the insert bit 10i when used in an impact application.

Figure 43:
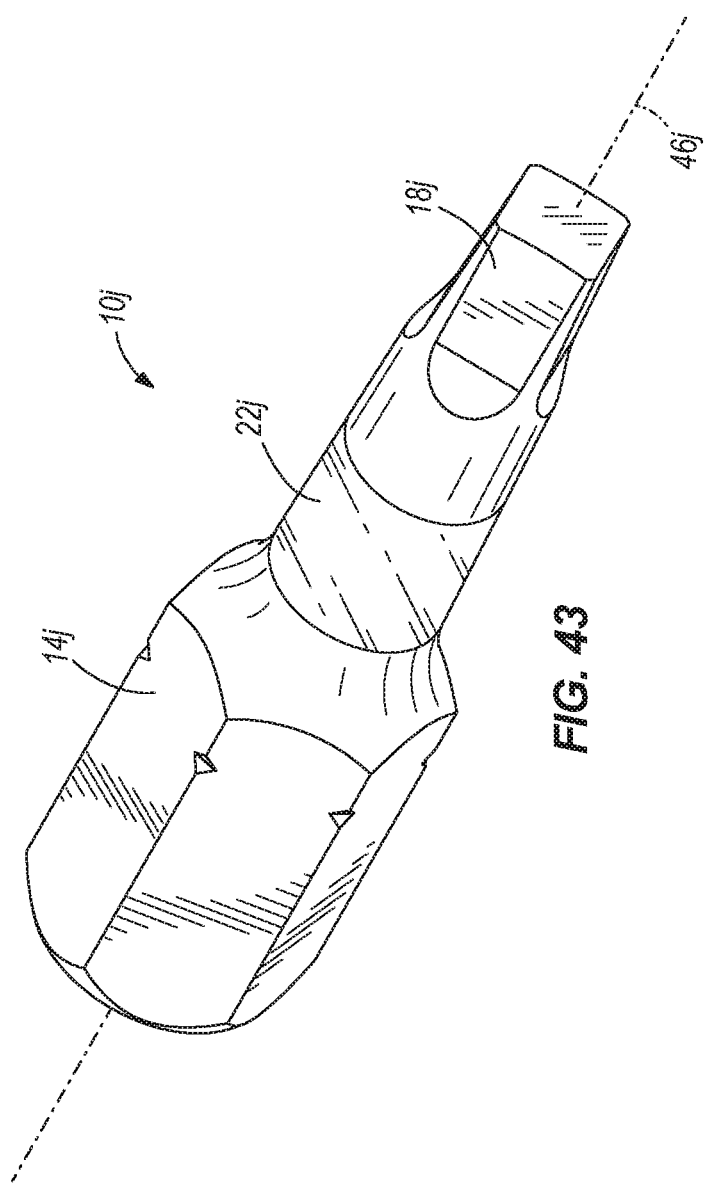
FIG. 43 is a perspective view of a tool bit according to another construction of the invention.
Figure 44:
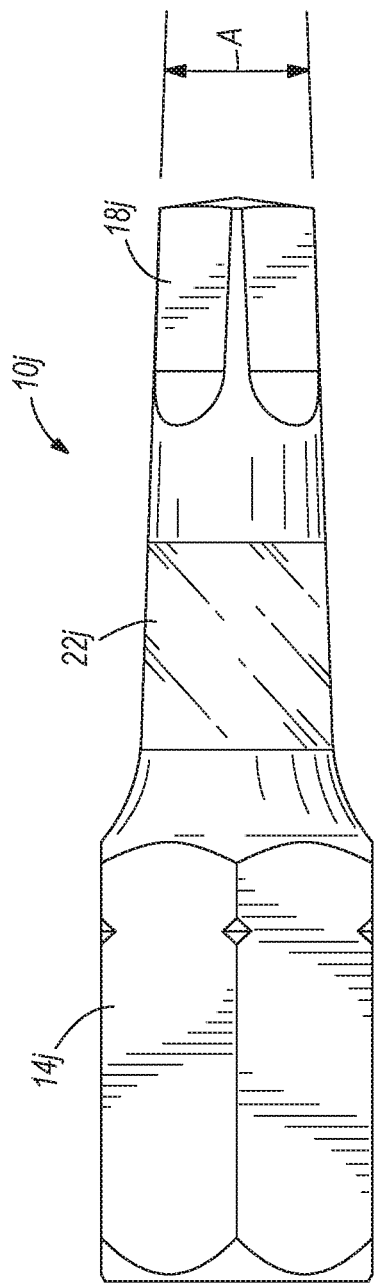
FIG. 44 is a side view of the tool bit of FIG. 43.
Figure 46:
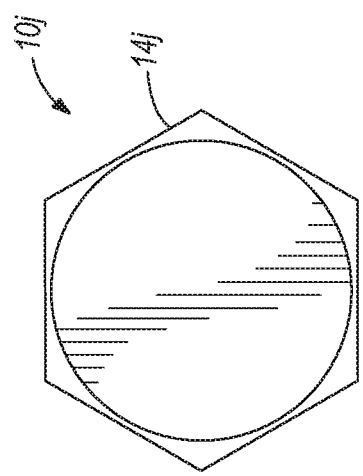
FIG. 46 is a rear view of the tool bit of FIG. 43.
Figure 45:
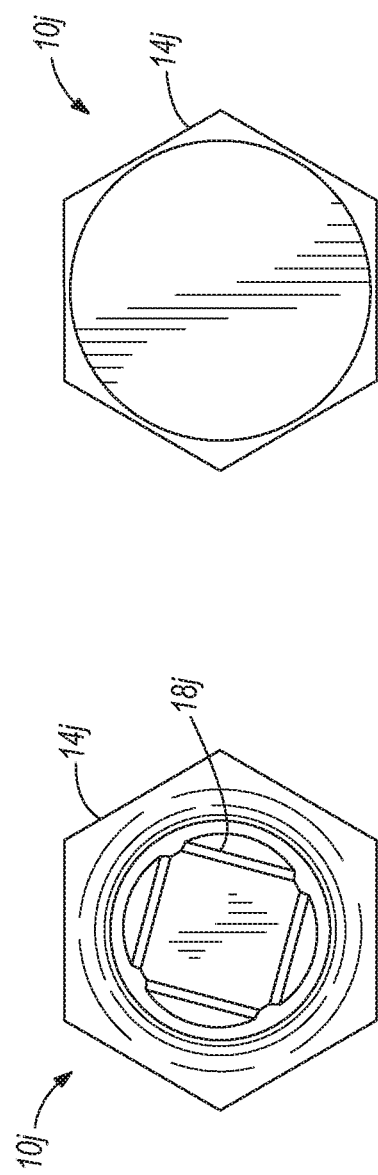
FIG. 45 is a front view of the tool bit of FIG. 43.

FIGS. 43-46 illustrate another construction of a tool bit or an insert bit 10j, with like components or features having like reference numerals including the letter "j." With reference to FIGS. 43-45, the tip 18j of the insert bit 10j is configured as a square tip 18j configured to be received within a fastener having a square recess.

With reference to FIG. 44, the shank 22j includes a tapered cylindrical shape defining an included angle A of about 4.5 degrees. Alternatively, the shank 22j may include a tapered cylindrical shape defining an angle A more or less than about 4.5 degrees. As a further alternative, the shank 22j may include a substantially cylindrical shape similar to the shank 22i of the insert bit 10i.

Also, like the insert bit 10i, the drive portion 14j and the tip 18j of the insert bit 10j are coated with a layer or coating (e.g., manganese phosphate, etc.) to inhibit corrosion of the insert bit 10j. In addition, at least a portion of the shank 22j is polished to a surface finish of at least about 2 microns to remove the coating from the shank 22j. Alternatively, the shank 22j may be polished to a surface finish of about 1 micron to about 2 microns to remove the coating from the shank 22j. The method of manufacturing the insert bit 10j and the manner of operation of the insert bit 10j are substantially similar to that described above with respect to the insert bit 10i.

Figure 47:
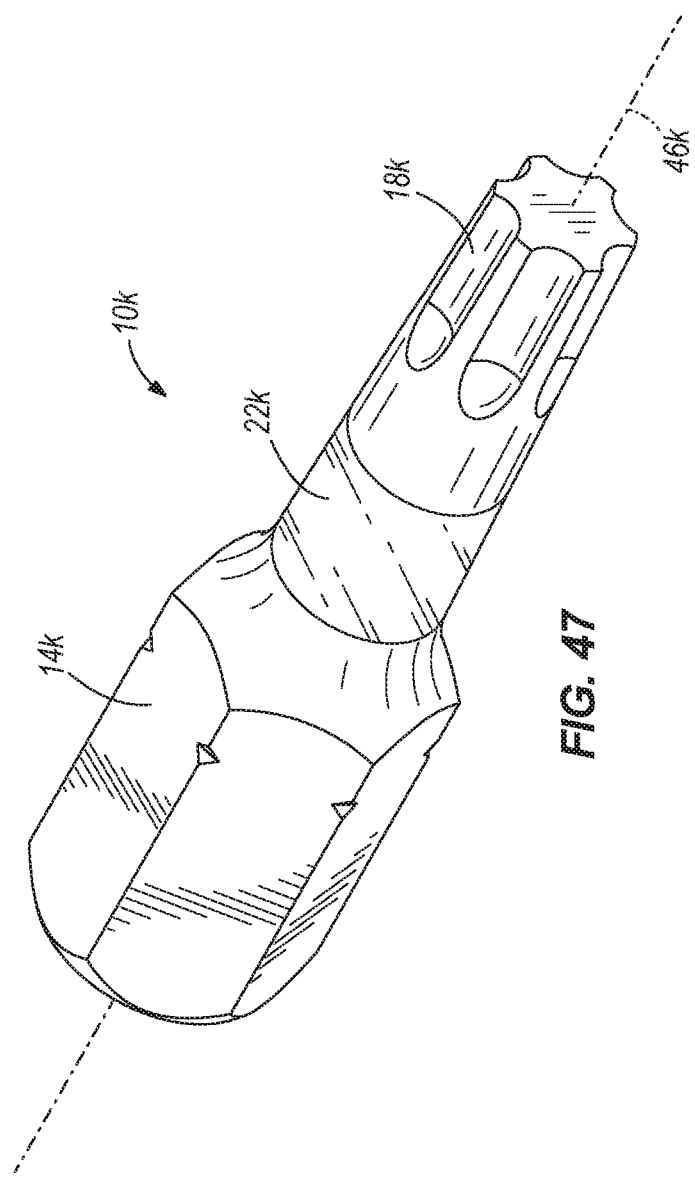
FIG. 47 is a perspective view of a tool bit according to another construction of the invention.

FIGS. 47-50 illustrate another construction of a tool bit or an insert bit 10k that is similar to the insert bit 10j of FIGS. 43-46, with like components or features having like reference numerals including the letter "k." With reference to FIGS. 47-49, the tip 18k of the insert bit 10k is configured as a TORX screw tip 18k.

With reference to FIG. 48, the shank 2kj includes a tapered cylindrical shape defining an included angle A of about 4.5 degrees. Alternatively, the shank 22k may include a tapered cylindrical shape defining an angle A more or less than about 4.5 degrees. As a further alternative, the shank 22k may include a substantially cylindrical shape similar to the shank 22i of the insert bit 10i.

Also, like the insert bits 10i, 10j, the drive portion 14k and the tip 18k of the insert bit 10k are coated with a layer or coating (e.g., manganese phosphate, etc.) to inhibit corrosion of the insert bit 10k. In addition, at least a portion of the shank 22k is polished to a surface finish of at least about 2 microns to remove the coating from the shank 22k. Alternatively, the shank 22k may be polished to a surface finish of about 1 micron to about 2 microns to remove the coating from the shank 22k. The method of manufacturing the insert bit 10k and the manner of operation of the insert bit 10k are substantially similar to that described above with respect to the insert bit 10i.

Various features of the invention are set forth in the following claims.

What is claimed is:

1. A tool bit comprising:
a hexagonal drive portion;
a working end configured to engage a fastener;
a shank interconnecting the drive portion and the working end, the shank and the working end including an outer peripheral surface, the outer peripheral surface tapering linearly along an entire length of the shank in a direction away from the drive portion, the outer peripheral surface also tapering linearly along an entire length of the working end in the direction away from the drive portion, wherein the length of the shank is greater than the length of the working end; and
a concave curvature between the hexagonal drive portion and the shank, wherein the curvature is within a plane that is coplanar with a central axis of the tool bit, wherein the tool bit does not include a concave curvature formed between the shank and the working end, wherein a ratio of the entire length of the shank to a length of the tool bit is between about 0.15:1 and about 0.35:1, wherein the outer peripheral surface defines a maximum diameter of the shank and a minimum diameter of the shank, and wherein a ratio of the minimum diameter to the maximum diameter is between about 0.7:1 and about 0.95:1.

2. The tool bit of claim 1, wherein the outer peripheral surface has a tapered cylindrical shape.

3. The tool bit of claim 2, wherein the working end has a square cross-sectional shape.

4. The tool bit of claim 1, wherein the hexagonal drive portion and the working end each include a corrosion-resistant coating.

5. The tool bit of claim 4, wherein the corrosion-resistant coating is manganese phosphate.

6. The tool bit of claim 1, further comprising an identification band positioned between the hexagonal drive portion and the shank.

7. The tool bit of claim 1, wherein the working end has a square cross-sectional shape.

8. The tool bit of claim 1, wherein the shank defines an included angle of less than 4.5 degrees.

9. A tool bit comprising:
a hexagonal drive portion;
a working end configured to engage a fastener; and
a shank interconnecting the drive portion and the working end, the shank including a cylindrical outer peripheral surface, the cylindrical outer peripheral surface having a curvature in a plane that is coplanar with a central axis of the tool bit, the curvature positioned adjacent the hexagonal drive portion away from the working end;
wherein the cylindrical outer peripheral surface of the shank does not increase in diameter along an entire length of the shank in a direction from the drive portion toward the working end, wherein a ratio of a length of the shank to the length of the tool bit is between about 0.2:1 and about 0.7:1, and wherein a ratio of a radius of the curvature of the outer peripheral surface to a length of tool bit is between about 0.08 and about 0.75.

10. The tool bit of claim 9, wherein the working end is a square shaped working end.

11. The tool bit of claim 9, wherein the curvature is concave and is formed at a first end of the shank, and wherein the shank does not include a concave curvature formed at a second end of the shank opposite the first end of the shank.

12. The tool bit of claim 9, wherein the hexagonal drive portion and the working end each include a corrosion-resistant coating.

13. The tool bit of claim 9, wherein the tool bit includes a hardness between about 52 HRC and about 60 HRC.

14. The tool bit of claim 9, wherein the working end is a square shaped working end.

15. The tool bit of claim 9, wherein the cylindrical outer peripheral surface of the shank tapers in the direction from the drive portion toward the working end.

* * * * *